(12) United States Patent
Ohly

(10) Patent No.: US 7,487,229 B2
(45) Date of Patent: Feb. 3, 2009

(54) METHODS AND APPARATUS TO SYNCHRONIZE LOCAL TIMES AT NODES IN A COMPUTER NETWORK

(75) Inventor: Patrick Ohly, Bonn (DE)

(73) Assignee: Intel Corporation, Santa Clara, CA (US)

( * ) Notice: Subject to any disclaimer, the term of this patent is extended or adjusted under 35 U.S.C. 154(b) by 473 days.

(21) Appl. No.: 11/393,100

(22) Filed: Mar. 30, 2006

(65) Prior Publication Data

US 2007/0266119 A1    Nov. 15, 2007

(51) Int. Cl.
G06F 15/16 (2006.01)
(52) U.S. Cl. .................. 709/219; 709/220; 709/224; 713/190; 702/186
(58) Field of Classification Search .............. 709/219, 709/224, 227, 228; 702/186; 713/190
See application file for complete search history.

(56) References Cited

U.S. PATENT DOCUMENTS

| 6,658,467 B1 * | 12/2003 | Rice et al. ............. 709/224 |
| 6,763,321 B2 * | 7/2004 | Gross et al. ............. 702/186 |
| 6,941,463 B1 * | 9/2005 | Atallah et al. ........... 713/190 |
| 7,065,573 B2 * | 6/2006 | Byrnes ................... 709/224 |
| 2002/0116493 A1 * | 8/2002 | Schenkel et al. ......... 709/224 |
| 2002/0143935 A1 * | 10/2002 | Schenkel et al. ......... 709/224 |
| 2002/0147675 A1 * | 10/2002 | Das et al. ................ 705/37 |
| 2003/0051032 A1 * | 3/2003 | Schenkel et al. ......... 709/224 |
| 2007/0198658 A1 * | 8/2007 | Aggarwal et al. ........ 709/219 |

OTHER PUBLICATIONS

Kruger, CJC, "Constrained Cubic Spline Interpolation," Chemical Engineering Applications, 5 pages., 2003.
Maillet, Eric and Tron, Cecile, "On Efficiently Implementing Global Time for Performance Evaluation on Multiprocessor Systems," Journal of Parallel and Distributed Computing, 1995, pp. 84-93, Academic Press, Inc.
McKinley, Sky and Levine, Megan, "Cubic Spline Interpolation," Math 45: Linear Algebra, 15 pages., 1998.
Mills, David L., "Network Time Protocol (Version 3) Specification, Implementation and Analysis," Network Working Group, Mar. 1992, pp. i-vii, 1-112, University of Delaware.
Mosberger, David and Eranian, Stephane, "ia-64 linux kernel," Linux Internals, Chapter 8: Symmetric Multiprocessing, pp. 355-361, Prentice Hall, Upper Saddle River, NJ., 2002.

* cited by examiner

Primary Examiner—Khanh Dinh
(74) Attorney, Agent, or Firm—Hanley, Flight & Zimmerman, LLC

(57) ABSTRACT

Methods and apparatus to synchronize local times at nodes in a computer network are disclosed. An example method disclosed herein comprises determining a sequence of time sample pairs, wherein each time sample pair in the sequence of time sample pairs comprises a respective local time measurement generated by a node in the computer network and a respective reference time measurement generated by a reference time source. The example method further comprises determining a plurality of cubic splines, wherein each cubic spline in the plurality of cubic splines interpolates between two respective time sample pairs in the sequence of time sample pairs. Additionally, the example method further comprises mapping a local time value associated with the node to a corresponding reference time value associated with the reference time source based on the plurality of cubic splines. Other embodiments are described and claimed.

27 Claims, 14 Drawing Sheets

METHODS AND APPARATUS TO SYNCHRONIZE LOCAL TIMES AT NODES IN A COMPUTER NETWORK

FIELD OF THE DISCLOSURE

This disclosure relates generally to computer systems and networks, and, more particularly, to methods and apparatus to synchronize local times at nodes in a computer network.

BACKGROUND

Computer networks that include multiple nodes executing programs in parallel are commonplace today. Such multi-node computer networks include large clusters of workstations connected by, for example, a local area network (LAN), down to small multi-core processors connected by a shared memory. Each of the nodes in the computer network may run at different, and possibly varying, frequencies due to, for example, different clock sources driving each node. Design and optimization of multi-processing and parallel processing applications for operation in these multi-node computer networks benefits from the ability to compare the processing times and interrelationships of the various nodes on a common time base. Trace collection and analysis tools support this comparison by mapping local time values of interest associated with each node to corresponding reference time values associated with a reference time source in the communication network. However, trace collection and analysis tools based on existing techniques for synchronizing local times at nodes to corresponding reference times have limited accuracy.

DETAILED DESCRIPTION

Figure 1:
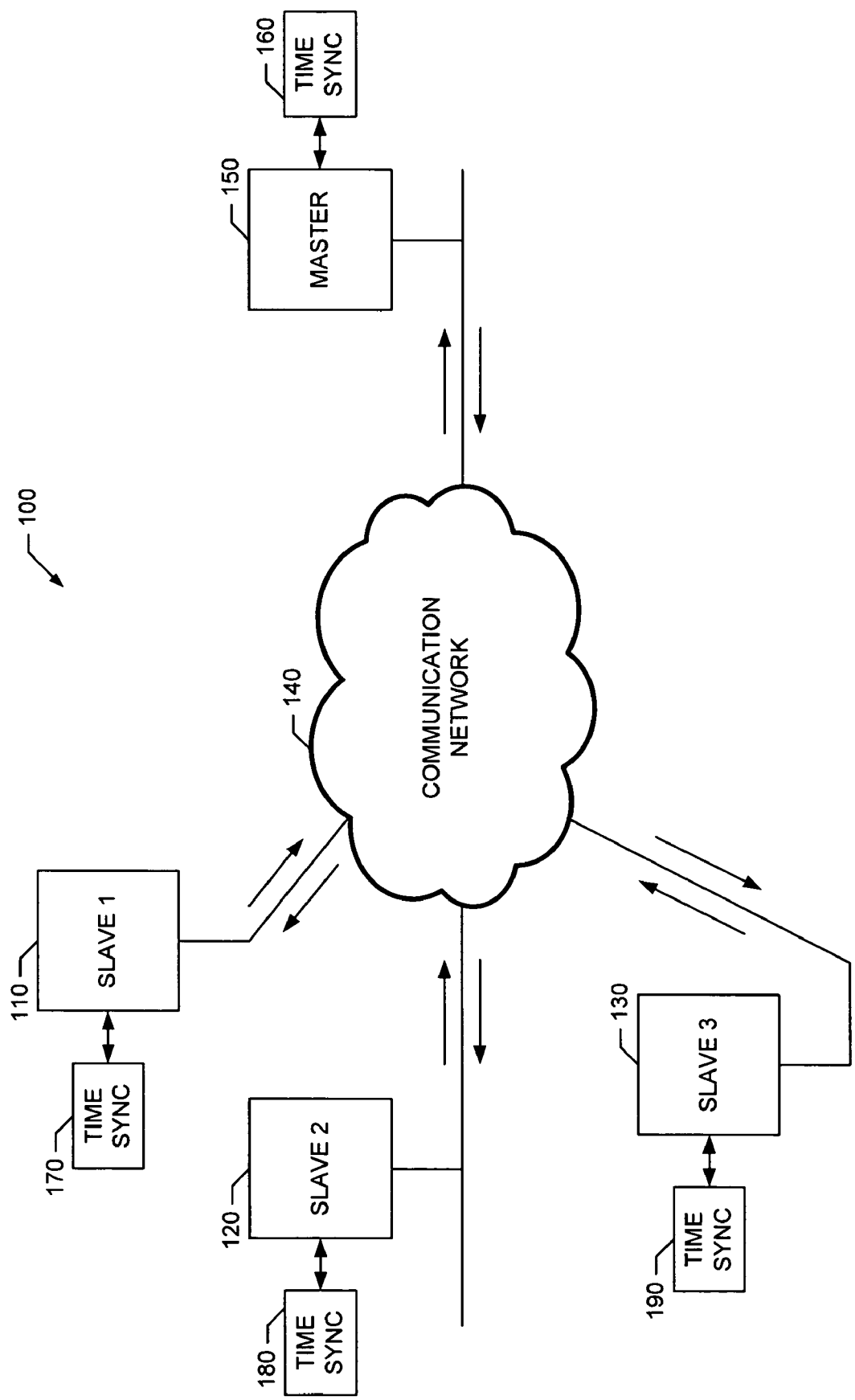
FIG. 1 is a block diagram of an example system for synchronizing local times at nodes in a computer network.

An example system 100 capable of synchronizing local times at nodes (e.g., such as slave nodes 110, 120 and 130) in a computer network 140 is shown in FIG. 1. The example time synchronization system 100 is configured to synchronize the local times at the nodes by mapping local time values to corresponding reference time values associated with a reference time source (e.g., such as a reference time source implemented by a master node 150). Time sample pairs formed by pairing local time measurements and reference time measurements are used by the example time synchronization system 100 to relate local times to reference times. Furthermore, interpolation, such as constrained cubic spline interpolation, between time sample pairs is employed to allow any local time value occurring between time sample pairs to be mapped to a corresponding reference time value.

The example time synchronization system 100, as shown, includes three slave nodes 110, 120 and 130, and a master node 150 communicatively coupled by the communication network 140. Any or all of the slave nodes 110-130 and/or the master node 150 may be any kind of node, such as, but not limited to, a computer network node, such as a stand-alone computer (e.g., such as the computer 1400 of FIG. 14), a server, a bridge, a router, etc. Additionally or alternative, any or all of the slave nodes 110-130 and/or the master node 150 may be a wireless network node, such as a mobile cellular telephone, a cordless digital telephone, a wireless access point, etc. Additionally or alternatively, the slave nodes 110-130 and/or the master node 150 may be individual processing elements in, for example, a multiprocessor system, a parallel processing system, etc. In such a configuration, the communication network 140 may be eliminated and/or replaced by a bus or other local communication path as explained below. Furthermore, the slave nodes 110-130 and/or the master node 150 may include any combination of such aforementioned nodes or the like.

The communication network 140 may be any kind of communication network, such as, but not limited to, a computer communication network, such as the Internet, a proprietary local area network (LAN) or wide area network (WAN), a dedicated leased line network link, a point-to-point microwave/satellite network, etc. Additionally or alternatively, the communication network 140 may be a wireless digital network, such as a mobile cellular network, a wireless digital network (e.g., WLAN, WiFi, WIMAX and/or Bluetooth), etc. Additionally or alternatively, the communication network 140 may be a communication interconnect, backplane, shared memory, etc. configured to communicatively couple multiple, individual processing elements in a multiprocessor system, a parallel processing system and/or the like. Furthermore, the communication network 140 may include any combination of such aforementioned communication networks or the like.

Although FIG. 1 depicts one master node 150 and three slave nodes 110-130 for clarity, the example time synchronization system 100 and the techniques disclosed herein may be adapted to support any number of master nodes and slave nodes. Furthermore, although FIG. 1 depicts a single communication network 140 for clarity, the example time synchronization system 100 and the techniques disclosed herein may be adapted to support any number of communication networks and any configuration of master node(s) and slave node(s) among the any number of communication networks.

To enable local time synchronization, the example system includes time synchronizers 160, 170, 180 and 190. As discussed below, any or all of the time synchronizers 160-190 may be implemented as general purpose time synchronizers and/or special purpose time synchronizers. General purpose time synchronizers are capable of supporting both time measurement reporting and time interpolation and mapping, and may be used with master nodes (i.e., reference time sources) and/or slave nodes. Special purpose time synchronizers, on the other hand, may be configured to support only measurement reporting or time interpolation and mapping, and/or may be configured to be used with only master nodes (i.e., reference time sources) or slave nodes.

In an example implementation of the time synchronization system 100, each time synchronizer 170, 180 and 190 is configured to locally map local time values associated with its respective slave node 110, 120 and 130 to corresponding reference time values associated with the master node 150. For example, focusing on slave node 110 and time synchronizer 170, the time synchronizer 170 may be configured to relate local times to reference times initially at desired (e.g., predetermined) time intervals by determining time sample pairs in which a particular time sample pair includes a local time measurement and a corresponding reference time measurement. The time synchronizer 170 may obtain the reference time measurement from the master node 150 in the form of a reference time stamp derived from sampling a reference clock providing reference time at the master node 150. To obtain the reference time measurement, the time synchronizer 170 may send a measurement trigger message over the communication network 140 to the master node 150 and/or the time synchronizer 160 associated with the master node 150. Then, in response to the trigger message, the time synchronizer 160 may send the reference time measurement (e.g., reference time stamp) to the time synchronizer 170 or associated slave node 110 via a measurement reporting message sent over the communication network 140.

The time synchronizer 170 may obtain the local time measurement corresponding to the returned reference time measurement based on local time stamps derived from sampling a local clock providing local time at the slave node 170. For example, the time synchronizer 170 may be configured to obtain a first (e.g., send) local time stamp when the measurement trigger message is sent to the master node 150 and/or time synchronizer 160. The time synchronizer 170 may then be configured to obtain a second (e.g., receive) local time stamp when the measurement reporting message is received from the master node 150 and/or time synchronizer 160. Assuming that propagation time for both messages is approximately equal and the time to obtain the reference time stamp is negligible, the average of the first (send) and second (receive) local time stamps corresponds to the absolute time at which the reference time stamp was generated. Thus, the time synchronizer 170 may determine the local time measurement corresponding to the reference time measurement by averaging the first (send) local time stamp and the second (receive) local time stamp.

Next, after determining a sequence of time sample pairs at desired (e.g., predetermined) time intervals to relate local times to reference times over a desired (e.g., predetermined) time domain, the time synchronizer 170 may be configured to implement an interpolation, such as a constrained cubic spline interpolation, between time sample pairs to allow any local time value occurring in an interval between adjacent time sample pairs to be related (e.g. mapped) to a corresponding reference time value in the interval. To implement constrained cubic spline interpolation, the time synchronizer 170 may determine a sequence of constrained cubic splines, one cubic spline corresponding to each time interval defined by adjacent time sample pairs. Then, to map a particular local time value to a corresponding reference time value, the time synchronizer 170 selects the time interval in which the particular local value lies, and then evaluates the constrained cubic spline corresponding to the selected interval to determine the reference time value corresponding to the particular local time value.

Persons of ordinary skill in the art will appreciate that, in the preceding example, a general purpose time synchronizer could be implemented to support both: (1) the reference time measurement reporting functionality described in connection with the time synchronizer 160 and (2) the time sample pair determination, constrained cubic spline interpolation and time value mapping functionality described in connection with the time synchronizer 170. On the other hand, persons of ordinary skill in the art will appreciate that special purpose time synchronizers could be implemented to support either: (1) the reference time measurement reporting functionality described in connection with the time synchronizer 160 or (2) the time sample pair determination, constrained cubic spline interpolation and time value mapping functionality described in connection with the time synchronizer 170.

In another example implementation of the time synchronization system 100, the time synchronizer 160 is configured to centrally map local time values associated with each slave node 110, 120 and 130 to corresponding reference time values associated with the master node 150. In such an implementation, the time synchronizer 160 associated with the master node 150 is configured to determine the sequence of time sample pairs used to relate local times to reference times at desired (e.g., predetermined) intervals. As such, each time synchronizer 170, 180 and 190 is configured to determine a local time measurement (e.g., local time stamp) in response to a common measurement trigger message and/or an individually addressed measurement trigger message received from the time synchronizer 160 over the communication network 140. Each time synchronizer 170, 180 and 190 is further configured to report its local time measurement back to the time synchronizer 160 via a measurement reporting message sent over the communication network 140.

The time synchronizer 160 may obtain the reference time measurement corresponding to each returned reference local measurement based on averaging reference time stamps obtained when each measurement trigger message is sent and when each measurement reporting message is received. Assuming that propagation time for trigger messages and reporting messages is approximately equal for a particular slave node, and the time to obtain the local time stamp at a particular slave node is negligible, the average of the reference time stamps obtained when a trigger message is sent and a reporting message is received at the time synchronizer 160 corresponds to the absolute time at which the local time stamp was generated for the corresponding slave node.

Next, after determining a sequence of time sample pairs for each slave node 110-130 to relate local times to reference times over a desired (e.g., predetermined) time domain, the time synchronizer 160 may be configured to implement constrained cubic spline interpolations between time sample pairs in each sequence to allow any local time value for a particular slave node occurring in an interval between adjacent time sample pairs to be related (e.g. mapped) to a corresponding reference time value in the interval. Similar to the previous example, to implement the constrained cubic spline interpolation corresponding to a particular slave node, the time synchronizer 160 may determine a sequence of constrained cubic splines, one cubic spline corresponding to each time interval defined by adjacent time sample pairs in the sequence corresponding to the particular slave node. Then, to map a particular local time value associated with a particular slave node to a corresponding reference time value, the time synchronizer 160 selects the time interval in which the particular local value lies, and then evaluates the constrained cubic spline corresponding to the selected interval to determine the reference time value corresponding to the particular local time value for the particular slave node.

Persons of ordinary skill in the art will appreciate that, in the preceding example, a general purpose time synchronizer could be implemented to support both the local time measurement reporting functionality described in connection with the time synchronizers 170-190 and the time sample pair determinations, constrained cubic spline interpolations and time value mapping functionality described in connection with the time synchronizer 160. Furthermore, a truly general purpose time synchronizer could be implemented to support the time measurement reporting, time sample pair determination, constrained cubic spline interpolation and time value mapping functionality required in both of the preceding example implementations of the time synchronization system 100. On the other hand, persons of ordinary skill in the art will appreciate that special purpose time synchronizers could implemented to support either the local time measurement reporting functionality described in connection with the time synchronizers 170-190 or the time sample pair determinations, constrained cubic spline interpolations and time value mapping functionality described in connection with the time synchronizer 160.

Figure 2:
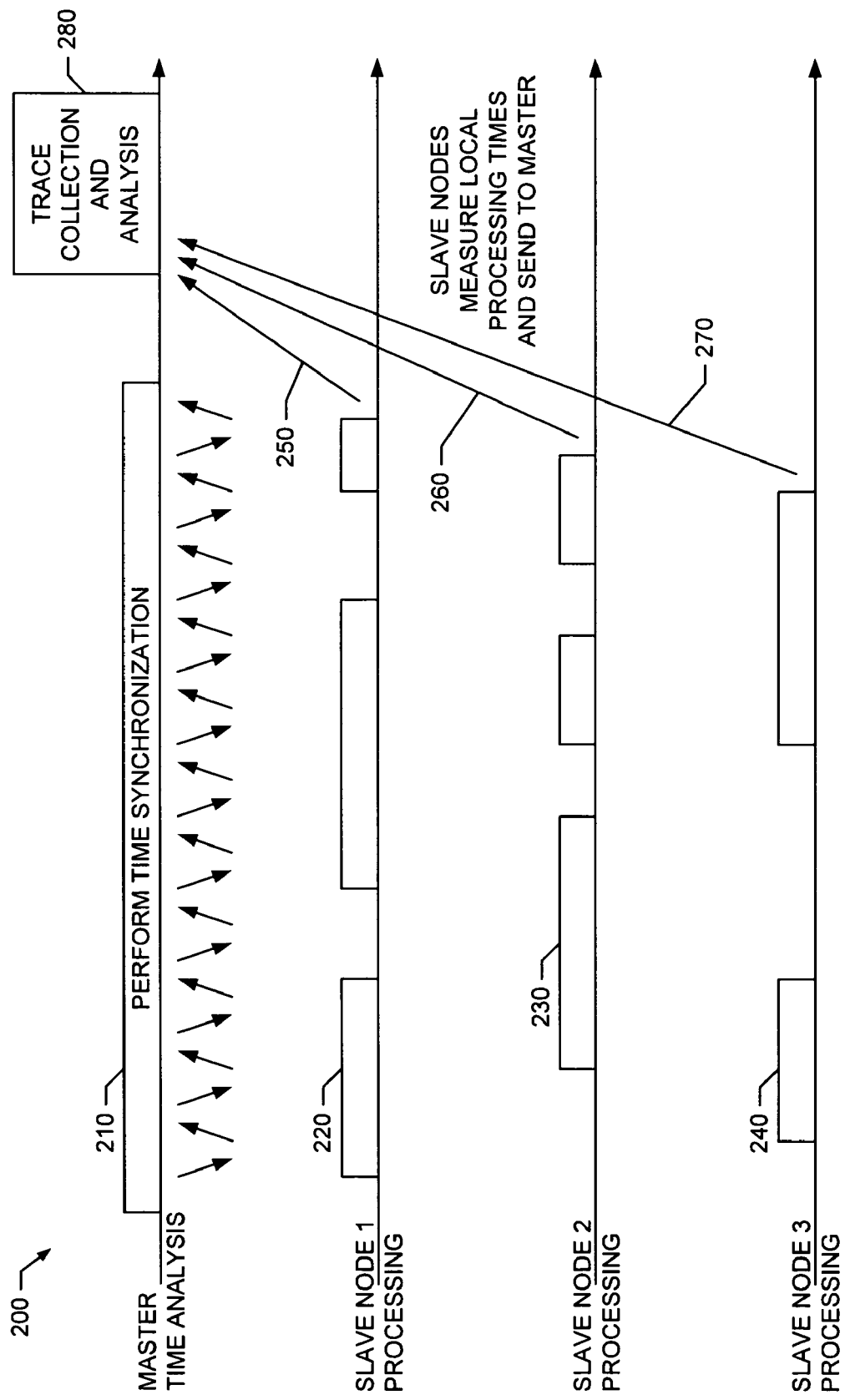
FIG. 2 illustrates an example application utilizing the synchronized local times generated by the example system of FIG. 1.

An example application 200 employing the local time synchronization capability of the example time synchronization system 100 of FIG. 1 is illustrated in FIG. 2. The example application 200 provides trace collection and analysis capability for a multiprocessor system. In a multiprocessor system, each individual processor (core) might run at a different and possibly varying clock frequency depending on, for example, the stability of the local clock/oscillator driving the processor, the processing load of the processor, etc. The local time synchronization capability of the example time synchronization system 100 allows the processing load of each processor in the multiprocessor system to be compared accurately based on a common reference time to enable, for example, throughput analysis, comparison of related events on different nodes (e.g., such as sending a message from one node and receiving the same message at another node), analysis of potential bottlenecks, multiprocessor and/or parallel processing optimization, etc.

The example application 200 is based on the example time synchronization system 100 illustrated in FIG. 1 that includes the three slave nodes 110-130 and the master node 150. For the example application 200 of FIG. 2, the three slave nodes 110-130 correspond to three individual processors (cores) in a multiprocessor system. The master node 150 corresponds to a fourth processor (core) used to provide the reference time source for trace collection and analysis. Optionally, the master node 150 may perform normal processing in addition to providing the reference time source. Over a monitored time domain depicted by bar 210, the master node 150 and slave nodes 110-130 determine the sequences of time sample pairs corresponding to each slave node 110-130 using, for example, either of the example implementation discussed previously for time synchronization system 100. As discussed above, the sequence of time sample pairs corresponding to a particular slave node is used to relate local time for the particular slave node to reference time at desired (e.g., predetermined) intervals.

During this same monitored time domain, each slave node 110-130 will be actively processing and idle at various times. For example, the period of active processing for slave node 110 is illustrated by bar 220, the period of active processing for slave node 120 is illustrated by bar 230 and the period of active processing for slave node 130 is illustrated by bar 240. Each slave node 110-130 may determine local processing time measurements corresponding to periods of active processing by making time stamp measurements, for example, when the slave node begins processing and when the slave node enters an idle state. Additionally or alternatively time stamp measurements may be taken during and/or in parallel to active processing. At the end of the monitored time domain, each slave node 110-130 reports its local processing time measurements to the master node 150 (e.g., illustrated by reports 250, 260 and 270) for trace collection and analysis (e.g. illustrated by block 280).

In an example implementation of the application 200, each slave node 110-130 employs the techniques described above in connection with FIG. 1 to perform its own constrained cubic spline interpolation and mapping of raw local processing time measurements to corresponding reference time values. Each slave node 110-130 then reports back the converted local processing time measurements to the master node 150 for trace collection and analysis. By mapping the raw local processing time values to corresponding reference time values, the active processing times for each slave node 110-130 may be compared based on a common time reference. Because each slave node 110-130 maps its own local processing time values to corresponding reference time values, the slave nodes 110-130 may, additionally or alternatively, exchange time measurements between themselves and enable trace collection and analysis without involving the master node 150. Furthermore, because each slave node 110-130 performs its own time mapping, the processing load associated with mapping from local to reference time is distributed throughout the time synchronization system 100.

In another example implementation of the application 200, the slave nodes 110-130 may report back raw local processing time measurements to the master node 150. In such an implementation, the master node 150 may employ the techniques described above in connection with FIG. 1 to determine constrained cubic spline interpolations for each sequence of time sample pairs corresponding to each slave node 110-130 and then map the raw local processing time measurements reported by each slave node 110-130. Again, such a mapping permits comparison of the active processing times for each slave node 110-130 based on a common time reference.

Figure 3:
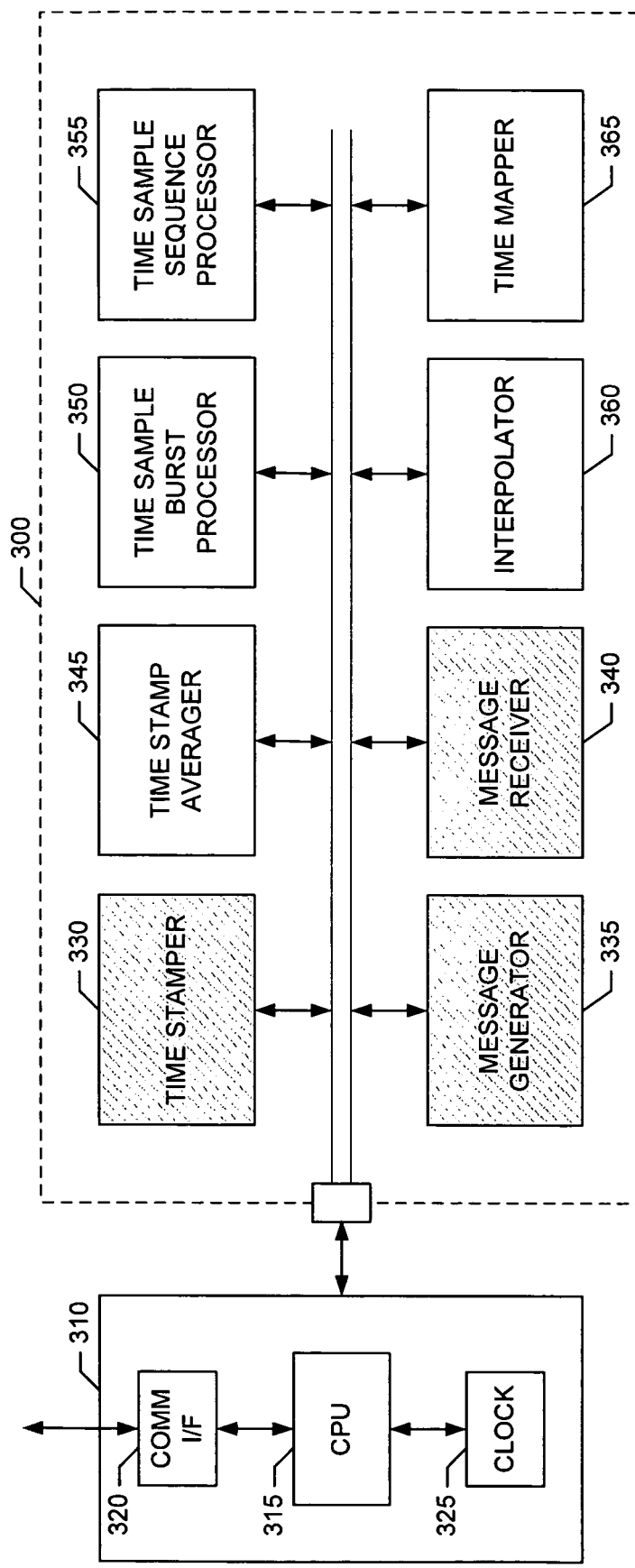
FIG. 3 is a block diagram of an example time synchronizer for use in the example system of FIG. 1.

A block diagram of an example time synchronizer 300 that may be used, at least in part, to implement any or all of the time synchronizers 160-190 of FIG. 1 is illustrated in FIG. 3. In the example of FIG. 3, the example time synchronizer 300 is shown to interface with an example node 310 that could be, for example, the master node 150 or one of the slave nodes 110-130 of FIG. 1. The example node 310 includes a central processing unit (CPU) 315, which may be any type of processor, such as, but not limited to, the processor 1412 of FIG. 14. The example node 310 also includes a communication interface 320 appropriately configured to interface with the communication network to which the example node 310 is communicatively coupled. For example, the example node 310 could be communicatively coupled to the communication network 140 of FIG. 1 and the communication interface 320 could be implemented by the interface 1424 of FIG. 14.

The example node 310 further includes a clock 325 configured to provide a local timing reference for the example node 310. Additionally or alternatively, the clock 325 may also be used as a reference timing source (e.g., such as when the example node 310 corresponds to the master node 150 of FIG. 1) to which other local timing references are to be mapped using the techniques described herein. The clock 325 may correspond to any appropriate timing reference, such as, but not limited to a local oscillator, a temperature controlled crystal oscillator (TCXO), a timer, a counter, etc.

The example time synchronizer 300 is capable of providing local timing measurements (which may also be reference timing measurements) associated with the example node 310, processing remote timing measurements received from and associated with a remote (e.g., slave or master) node, and synchronizing local times to reference times by mapping local time values to reference time values. To obtain local time measurements, the example time synchronizer 300 includes a time stamper 330 configured to obtain a time stamp corresponding to the time associated with the clock 325. For example, the time stamper 330 may be configured to issue an instruction to the CPU 315 to read a present value of the clock 325 and translate the clock value to a numeric format corresponding to real time (e.g., such as hours, minutes, seconds, fractions of seconds). If the example node 310 corresponds, for example, to one of the slave nodes 110-130 of FIG. 1, the time stamp obtained by the time stamper 330 corresponds to a local time specific to the example node 310. On the other hand, if the example node 310 corresponds, for example, to the master node 150 of FIG. 1 which provides a reference timing source for the communication network, the time stamp obtained by the time stamper 330 corresponds to both a local time at the example node 310 as well as a reference time to which local times from other nodes are to be mapped.

The example time synchronizer 300 also includes a communication interface represented by the message generator 335 and the message receiver 340. For the case in which the example time synchronizer 330 is configured to perform the time synchronizing function by mapping local values to reference values, the message generator 335 may be configured to generate measurement trigger messages and transmit such messages to one or more other nodes to cause those nodes to perform a timing measurement. Furthermore, the message receiver 340 may be configured to receive and process measurement reporting messages transmitted back to the time synchronizer 300 by these other nodes in response to the measurement trigger messages. Additionally or alternatively, for the case in which the example time synchronizer 330 is configured to report timing measurements back to another node, the message receiver 340 may be configured to receive and process measurement trigger messages. In this case the message generator 335 may be configured to include the timing measurement performed in response to the received measurement trigger message in a measurement reporting message and to transmit the resulting measurement reporting message back to the requesting node. In either case, the message generator 335 and/or message receiver 340 may be configured to interface directly with, for example, the communication network 140 of FIG. 1, or interface with the communication network through the communication interface 320 of the example node 310 to which the example time synchronizer 300 is interfaced.

Persons of ordinary skill in the art will appreciate that there are various techniques that may be used to ensure that operation of the time stamper 330, the message generator 335 and/or the message 340 timely occurs. For example, if the time stamper 330, the message generator 335 and/or the message 340 are implemented as an application or applications executing on a CPU, the application developer could insert Application Programming Interface (API) calls into the code which have properties similar to the known Message Passing Interface (MPI) collective operations. Additionally or alternatively, the developer could implement a background task whose only task is to, for example, obtain time stamps and/or execute message exchanges at regular time intervals.

To perform time synchronizing by mapping local time values to reference time values, the example time synchronizer 300 includes a time stamp averager 345, a time sample sequence processor 350, a time sample burst processor 355, an interpolator 360 and a time mapper 365. The time stamp averager 345 may be configured to average time stamps obtained by the time stamper 330 when a measurement trigger message is generated by the message generator 335 and sent to other nodes and when a measurement reporting message is received by the message receiver 340 in response to a preceding measurement trigger message. As discussed above in connection with FIG. 1, assuming similar propagation delays for a measurement trigger messages and a corresponding measurement response message, and negligible internal processing time to determine the time measurement to include in the measurement response message, the average of the locally-generated time stamps determined by the time stamp average 345 corresponds to the absolute time at which the time measurement included in the received measurement reporting message was generated. Thus, the pairing of the average of the locally-generated time stamps and the time measurement included in the measurement reporting message relates the time base of the example node 310 to the time base of the responding node at that particular sample point in time.

To determine a sequence of time sample pairs that relate the time base at the example node 310 with the time base of another node, the example time synchronizer 300 includes a time sample sequence processor 350. The time sample sequence processor 350 determines the sequence of time sample pairs by pairing an average of locally-generated time stamps determined by the time stamp average 345 with a corresponding time measurement included in a measurement reporting message received from the other node. For example, consider the case in which the example node 310 corresponds to a slave node, such as one of the slave nodes 110-130 of FIG. 1, and the time synchronizer 300 is configured to implement the synchronizing function by locally mapping local time values associated with the node 310 to corresponding reference time values associated with the time base of the other node (e.g., wherein the other node is a master node acting as a reference timing source, such as the master node 150 of FIG. 1). In this case, the time measurement returned in the measurement reporting message corresponds to a reference time measurement. The average of the locally-generated time stamps (i.e., the time stamps obtained when the time synchronizer 300 sent the measurement trigger message and when the following measurement reporting message was received) determined by the time averager 345 corresponds to a local time measurement associated with the node 310. Thus, to obtain the sequence of sample pairs relating local time at the node 310 to the reference time associated with the other node, the time sample sequence processor 350 may be configured to pair local time measurements obtained as outputs of the time stamp averager 345 with corresponding reference time measurements included in received measurement reporting messages.

As another example, consider the case in which the example node 310 corresponds to a master node acting as a reference timing source, such as the master node 150 of FIG. 1, and the time synchronizer 300 is configured to implement the synchronizing function by centrally mapping local time values associated with the other node (e.g., wherein the other node is a slave node, such as one of the slave nodes 110-130 of FIG. 1) to corresponding reference time values associated with the time base of the node 310. In this case, the time measurement returned in the measurement reporting message corresponds to a local time measurement at the other node. The average of the locally-generated time stamps (i.e., the time stamps obtained when the time synchronizer 300 sent the measurement trigger message and when the following measurement reporting message was received) determined by the time averager 345 corresponds to a reference time measurement associated with the time base of the node 310. Thus, to obtain the sequence of sample pairs relating local time associated with the other node to reference time associated with the time base of the node 310, the time sample sequence processor 350 may be configured to pair local time measurements included in received measurement reporting messages with corresponding reference time measurements obtained as outputs of the time stamp averager 345. In either example implementation, however, the resulting output of the time sample sequence processor 350 is one or more sequences of time sample pairs, with each time sample pair including a local time measurement paired with a corresponding reference time measurement and each sequence corresponding to a particular local node.

To further reduce any measurement errors associated with, for example, unequal propagation times for measurement trigger messages and measurement response messages, and/or non-negligible internal processing times to obtain time measurements, the example time synchronizer 300 includes the time sample burst processor 355. The time sample burst processor 355 is configured to determine a "burst" of raw local and reference time measurements within a particular time measurement interval. The raw local and reference time measurements within a burst are then averaged, for example, by the time stamp averager 345 to obtain a resulting averaged local time measurement and averaged reference time measurement for the particular time measurement interval. The resulting averaged local time measurement and averaged reference time measurement are then provided as input to the time stamp sequence processor 350 from which the sequence of time sample pairs is determined. Persons of ordinary skill in the art will recognize that the process of averaging raw time measurements tends to cancel out deviations in propagation delays, measurement processing times, etc. An example operation of the time sample burst processor is discussed in greater detail below in connection with FIG. 6.

The example time synchronizer 300 further includes an interpolator 360 configured to implement an interpolation, such as a constrained cubic spline interpolation, between adjacent time sample pairs included in the sequence of time sample pairs determined by the time sample sequence generator 350. Interpolation allows any local time value occurring in an interval between adjacent time sample pairs to be related (e.g. mapped) to a corresponding reference time value in the interval. To implement constrained cubic spline interpolation, the interpolator 360 may be configured to determine a sequence of constrained cubic splines, one cubic spline corresponding to each time interval defined by adjacent time sample pairs in the sequence of time sample pairs determined by the time sample sequence processor 350. Furthermore, if the example time synchronizer 300 is configured to interface with a reference timing source (e.g., such as when the example node 310 corresponds to a master node) and to centrally map local times to reference times for multiple slave nodes, the interpolator 360 may be configured to implement sequences of constrained cubic splines, where each sequence of splines corresponds to a respective sequence of time sample pairs output by the time sample sequence processor 350 for each respective slave node. An example constrained cubic spline interpolation that may be implemented by the interpolator 360 is discussed in greater detail below in connection with FIG. 8.

To map a particular local time value associated with a slave node to a corresponding reference time value associated with a reference timing source, the time synchronizer 300 includes a time mapper 365. To perform such a mapping, the time mapper 365 may be configured to select the time interval in which the particular local value lies, wherein a time interval is defined by adjacent time sample pairs output by the time sample sequence processor 350. The time mapper 365 is further configured to evaluate the constrained cubic spline in the sequence of splines implemented by the interpolator 365 to interpolate between the adjacent time sample pairs which define the selected time interval. The resulting output of the constrained cubic spline provides the reference time value corresponding to the local time value. Furthermore, if the example time synchronizer 300 is configured to interface with a reference timing source (e.g., such as when the example node 310 corresponds to a master node) and to centrally map local times to reference times for multiple slave nodes, the time mapper 360 may be configured to select particular time intervals and constrained cubic spline sequences corresponding to a particular slave node whose local time value is to be mapped to a corresponding reference time value.

Persons of ordinary skill in the art will recognize that the example time synchronizer 300 shown in FIG. 3 corresponds to a general purpose time synchronizer discussed in connection with FIG. 1. Thus, the example time synchronizer 300 could be used with, for example, either the master node 150 or the slave nodes 110-130 of FIG. 1. Persons of ordinary skill in the art will also appreciate that special purpose time synchronizers, such as those discussed above in connection with FIG. 1, may be implemented to include portions of the functionality illustrated in example time synchronizer 300 of FIG. 3. For example, a special purpose time synchronizer configured to support only time measurement reporting in response to measurement trigger messages may include only the functionality represented by the shaded boxes in FIG. 3 (i.e., the functionality included in the time stamper 330, the message generator 335 and the message receiver 340 corresponding to generating time measurements in response to receiving measurement trigger messages). Furthermore, persons of ordinary skill in the art will recognize that the time synchronizer may be implemented as a stand-alone device coupled to the example node 310. Additionally or alternatively, any or all of the functionality included in the example time synchronizer 300 may be implemented by the example node 310 itself by, for example, machine readable instructions executed by the CPU 315.

Flowcharts representative of example machine readable instructions that may be executed to implement some or all of the example time synchronizer 300 of FIG. 3 and/or the example time synchronization system 100 of FIG. 1 are shown in FIGS. 4-5 and 7-10. In these examples, the machine readable instructions represented by each flowchart may comprise one or more programs for execution by: (a) a processor, such as the processor 1412 shown in the example computer 1400 discussed below in connection with FIG. 14, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 1412, but persons of ordinary skill in the art will readily appreciate that the entire program or programs and/or portions thereof could alternatively be executed by a device other than the processor 1412 and/or embodied in firmware or dedicated hardware in a well-known manner (e.g., implemented by an application specific integrated circuit (ASIC), a programmable logic device (PLD), a field programmable logic device (FPLD), discrete logic, etc.). For example, any or all of the time synchronizer 300, the time stamper 330, the message generator 335, the message receiver 340, the time stamp averager 345, the time sample sequence processor 350, the time sample burst processor 355, the interpolator 360, the time mapper 365, and/or time synchronization system 100 could be implemented by any combination of software, hardware, and/or firmware. Also, some or all of the machine readable instructions represented by the flowchart of FIGS. 4-5 and 7-10 may be implemented manually. Further, although the example machine readable instructions are described with reference to the flowcharts illustrated in FIGS. 4-5 and 7-10, persons of ordinary skill in the art will readily appreciate that many other techniques for implementing the example methods and apparatus described herein may alternatively be used. For example, with reference to the flowcharts illustrated in FIGS. 4-5 and 7-10, the order of execution of the blocks may be changed, and/or some of the blocks described may be changed, eliminated, combined and/or subdivided into multiple blocks.

Figure 4:
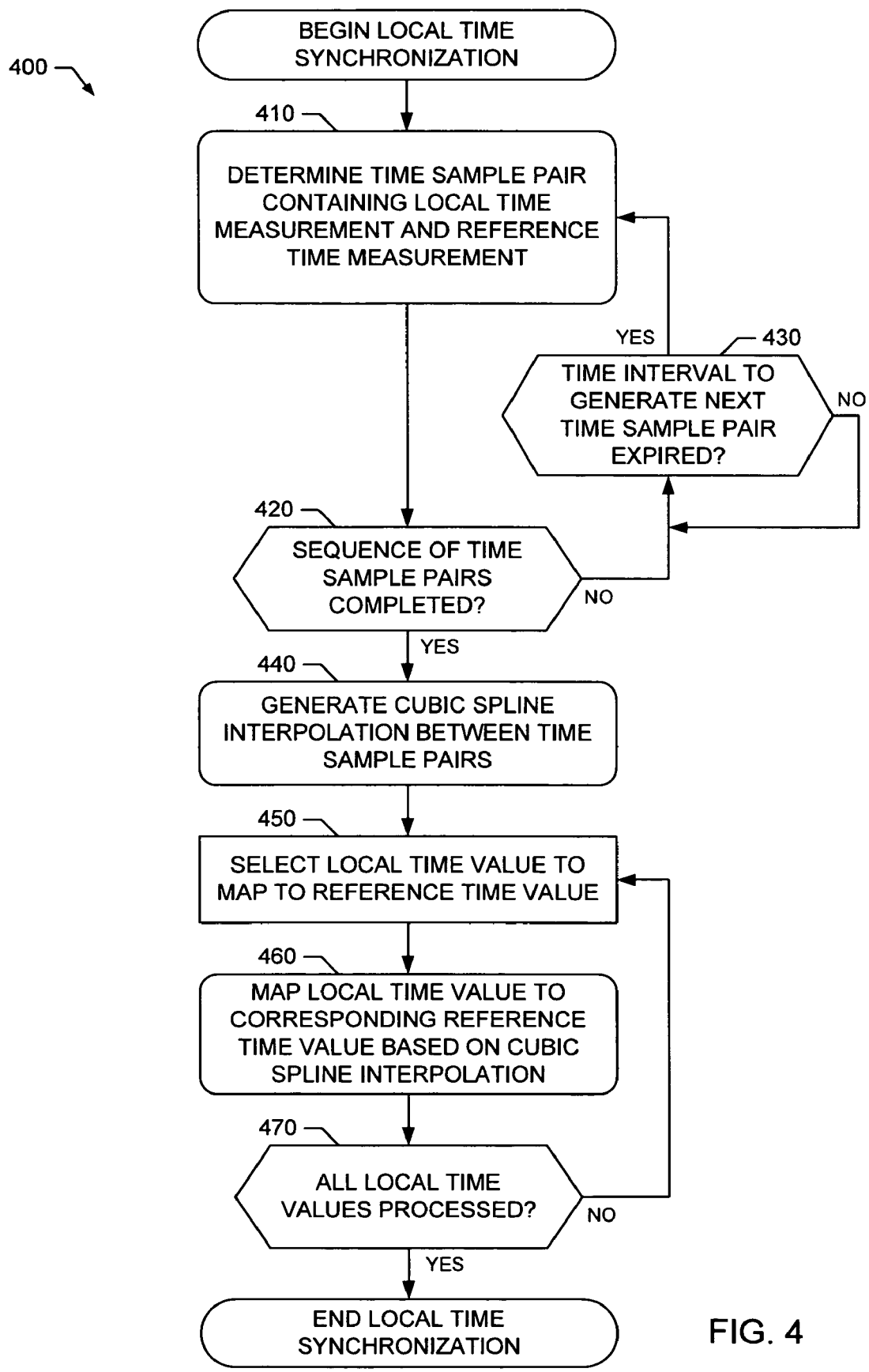
FIG. 4 is a flowchart representative of first example machine readable instructions that may be executed, at least in part, to implement the example time synchronizer of FIG. 3 and/or implement local time synchronization in the example system of FIG. 1.

Example machine readable instructions 400 that may be executed, at least in part, to implement the example time synchronization system 100 of FIG. 1 are shown in FIG. 4. As such, at least portions of the example machine readable instructions 400 may be executed by one or more time synchronizers, such as the time synchronizers 160-190 or the example time synchronizer 300 of FIG. 3, to perform time synchronization in the time synchronization system 100. The example machine readable instructions 400 may be executed whenever local time synchronization is to be performed locally at a slave node, such as any or all of the slave nodes 110-130 in the time synchronization system 100. Thus, the example machine readable instructions 400 enable a time synchronizer, such as any or all of the time synchronizers 170-190 in the time synchronization system 100, to map a local time value, $t_{local}$, associated with the slave node to a corresponding master reference time, $t_{master}$, associated with a reference timing source, such as the master node 150 in the time synchronization system 100. For simplicity, execution of the machine readable instructions 400 is described from the perspective of the time synchronizer 170 performing local time synchronization for the slave node 110 in the time synchronization system 100. Persons of ordinary skill in the art will recognize that operation of the example machine readable instruction 400 may be adapted to encompass local time synchronization performed by any or all of the time synchronizers 170-190 used with respective slave nodes 110-130 in the time synchronization system.

Referring to FIGS. 1 and 4, the machine readable instructions 400 begin execution at block 410 at which the time synchronizer 170 determines a time sample pair used to relate local time associated with the slave node 110 with reference time associated with the master node 150 at a particular sampling instant in time. For example, the time sample pair for sampling instant k may be denoted as $(t_{local\_avg,k}, t_{master\_avg,k})$ and be determined by the time synchronizer 170 by averaging individual local and reference time measurements, denoted as $t_{local\_meas,i}$ and $t_{master\_meas,i}$, respectively, obtained during a measurement interval associated with the sample instant, k. Example machine readable instructions that may be executed to implement block 410 are shown in greater detail in FIG. 5.

After the time sample pair $(t_{local\_avg,k}, t_{master\_avg,k})$ is determined at block 410, control proceeds to block 420 at which the time synchronizer 170 determines whether a complete sequence of time sample pairs has been obtained. A complete sequence of time samples may correspond, for example, to a predetermined time domain over which local time synchronization is to be performed. Furthermore, individual time sample pairs $(t_{local\_avg,k}, t_{master\_avg,k})$ in the sequence of time sample pairs may be spaced uniformly or non-uniformly in time. If the time synchronizer 170 is implemented based on the example of FIG. 3, the time sample sequence processor 350 included in the time synchronizer 170 may perform the determination at block 420. If the sequence of time sample pairs is not complete (block 420), control proceeds to block 430 at which the time synchronizer 170 (or, e.g., time sample sequence processor 350 included in the time synchronizer 170) waits until the next measurement interval at which the next time sample pair is to be determined. After waiting the appropriate time (block 430), control returns to block 410 at which the time synchronizer 170 determines the next time sample pair to be included in the sequence of time sample pairs.

However, if the sequence of time sample pairs is complete (block 420), control proceeds to block 440 at which the time synchronizer 170 generates constrained cubic splines to interpolate between adjacent time sample pairs in the sequence of time sample pairs. If the time synchronizer 170 is implemented based on the example of FIG. 3, the interpolator 360 included in the time synchronizer 170 may perform the interpolation at block 440. For example, prior to execution of block 440, the time synchronizer 170 has determined a sequence of time sample pairs $(t_{local\_avg,0}, t_{master\_avg,0})$, $(t_{local\_avg,1}, t_{master\_avg,1}), \ldots, (t_{local\_avg,n}, t_{master\_avg,n})$. Each pair of adjacent time sample pairs, $(t_{local\_avg,k}, t_{master\_avg,k})$ $(t_{local\_avg,k+1}, t_{master\_avg,k+1})$ forms a non-overlapping time interval in the time-domain spanned by the sequence of time sample pairs. Then, at block 440, the time synchronizer 170 (or, e.g., the interpolator 360 included in the time synchronizer 170) determines a sequence of n constrained cubic splines, denoted as $f_1(t), f_2(t), \ldots, f_n(t)$, with each spline corresponding to one of the n non-overlapping time intervals. In particular, the cubic spline $f_k(t)$ corresponding to the time interval having endpoints equal to the adjacent time sample pairs $(t_{local\_avg,k}, t_{master\_avg,k})$, $(t_{local\_avg,k+1}, t_{master\_avg,k+1})$ is generated to interpolate between these time sample pairs within this time interval. Example machine readable instructions that may be executed to implement block 440 are shown in greater detail in FIG. 8.

After processing at block 440 completes, control proceeds to block 450 at which the time synchronizer 170 selects a local time value $t_{local}$ associated with the slave node 110 to be mapped to a corresponding master reference time $t_{master}$ associated with the master node 150. For example, referring to the example application 200 of FIG. 2, the local time value $t_{local}$ may correspond to a processing time of interest at the slave node 110, such as when the slave node 110 commences processing, enters an idle mode, etc. Control then proceeds to block 460 at which the time synchronizer 170 maps the local time value $t_{local}$ to the corresponding reference time $t_{master}$ based on the constrained cubic spline interpolation generated at block 440. If the time synchronizer 170 is implemented based on the example of FIG. 3, the time mapper 365 included in the time synchronizer 170 may perform the mapping at block 460. For example, the time synchronizer 170 (or, e.g., the time mapper 365 included in the time synchronizer 170) may select the particular constrained cubic spline $f_m(t)$ corresponding to the non-overlapping time interval in which the local time value $t_{local}$ lies. The time synchronizer 170 (or, e.g., the time mapper 365 included in the time synchronizer 170) may then evaluate the selected constrained cubic spline $f_m(t)$ to determine the reference time $t_{master}$ corresponding to the local time value $t_{local}$ (i.e., $t_{master}=f_m(t_{local})$). Example machine readable instructions that may be executed to implement block 460 are shown in greater detail in FIG. 9.

After the mapping at block 460 completes, control proceeds to block 470 at which the time synchronizer 170 (or, e.g., the time mapper 365 included in the time synchronizer 170) determines whether there are additional local time values to be mapped to corresponding reference time values. If there are additional local time values to be mapped (block 470), control returns to block 450 and blocks subsequent thereto at which the time synchronizer selects another local time value $t_{local}$ and maps this local time value to a corresponding reference time value $t_{master}$. However, if all local time values have been mapped (block 470), execution of the example machine readable instructions 400 ends.

Figure 5:
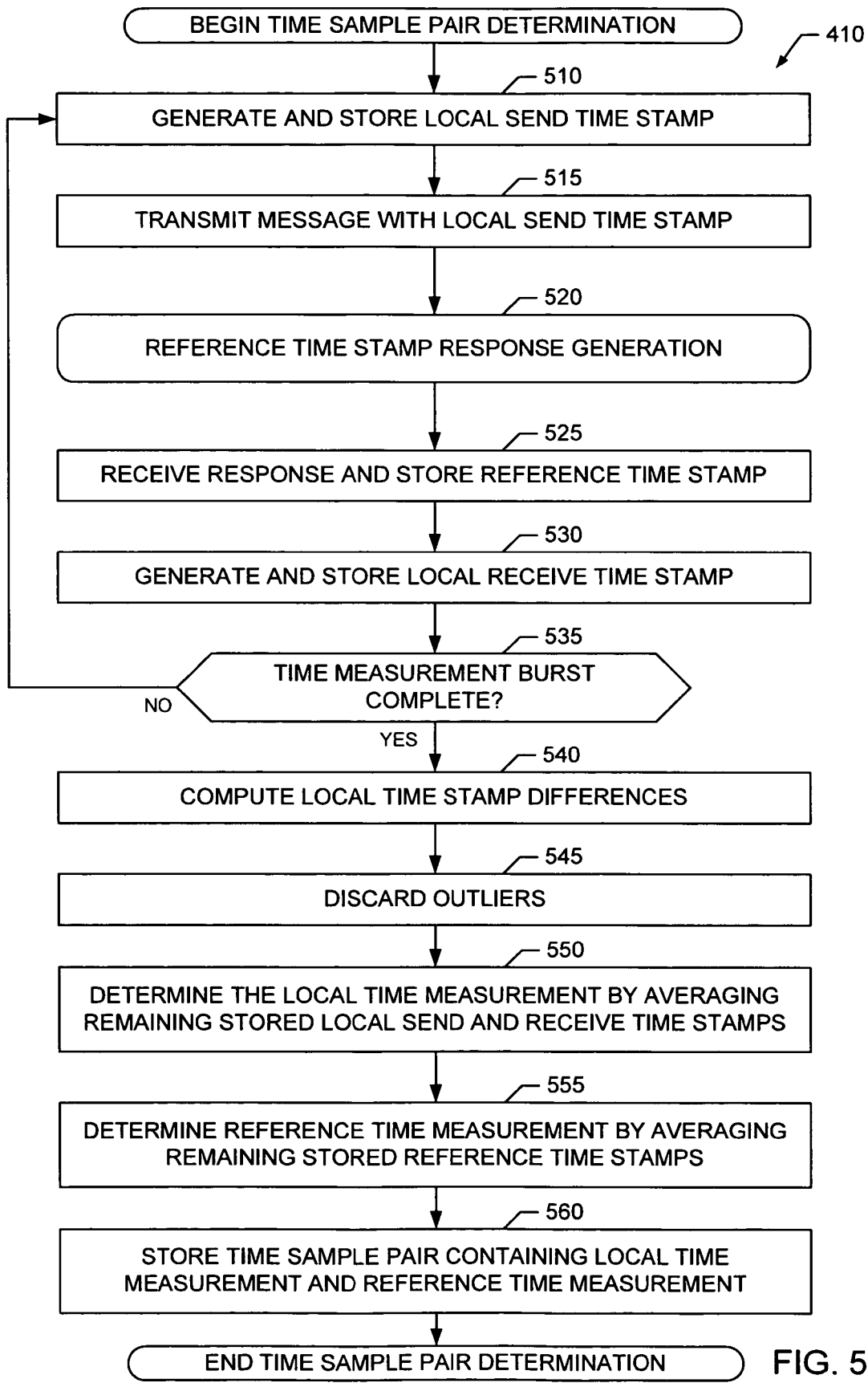
FIG. 5 is a flowchart representative of example machine readable instructions that may be executed, at least in part, to determine time sample pairs for use by the example machine readable instructions of FIG. 4 and/or to implement the example time synchronizer of FIG. 3.

FIG. 5 illustrates example machine readable instructions 410 that may be used to implement block 410 of the example machine readable instructions 400 of FIG. 4. The example machine readable instructions 410 of FIG. 5 operate to determine a time sample pair used to relate local time associated with a slave node (e.g., such as the slave node 110 of FIG. 1) with reference time associated with a master node (e.g., such as the master node 150 of FIG. 1) at a particular sampling instant in time. For simplicity, execution of the machine readable instructions 410 is described from the perspective of the time synchronizer 170 performing time sample pair determination locally for the slave node 110 in the time synchronization system 100 of FIG. 1. Persons of ordinary skill in the art will recognize that operation of the example machine readable instructions 410 may be adapted to encompass time sample pair determination performed locally by any or all of the time synchronizers 170-190 used with respective slave nodes 110-130 in the time synchronization system 100. Additionally or alternatively, the example machine readable instructions 410 may be adapted to encompass time sample pair determination performed centrally by the time synchronizer 160 used with respective master node 150 in the time synchronization system 100.

Figure 6:
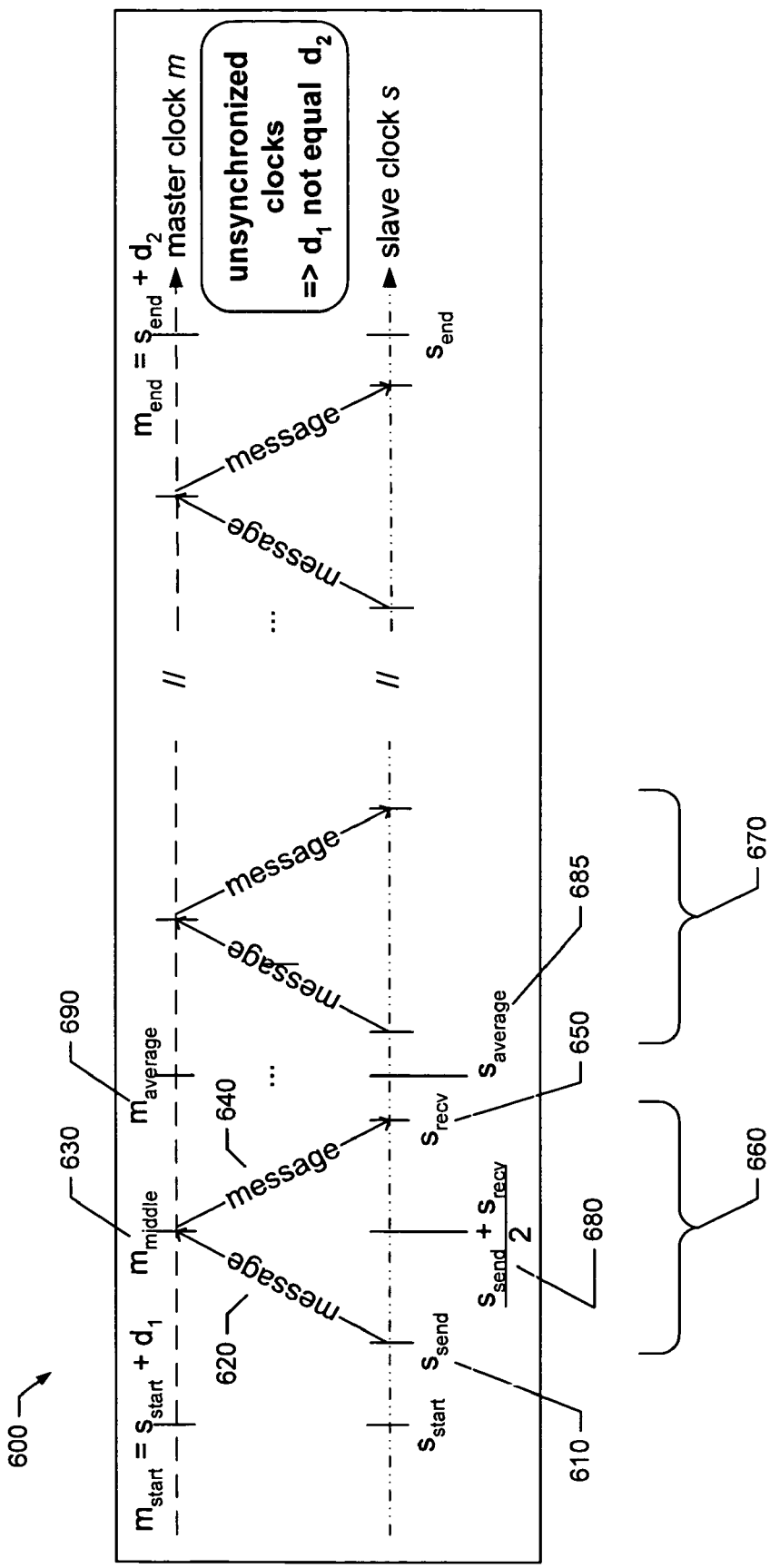
FIG. 6 illustrates an example sequence of time measurements and message exchanges performed by the example machine readable instructions of FIG. 5 to determine time sample pairs.

For illustrative purposes, an example time sample pair determination procedure 600 corresponding to execution of the machine readable instructions 410 is shown in FIG. 6 and referenced in the following description. Returning to FIG. 5, and further referring to FIGS. 1 and 6, the machine readable instructions 410 begin execution at block 510 at which the time synchronizer 170 determines a first local time stamp by sampling the local time base associated with the slave node 110. If, for example, the time synchronizer 170 and slave node 110 are implemented based on the example of FIG. 3, the time stamper 330 included in the time synchronizer 170 may determine the first time stamp at block 510 by sampling the clock 325 included in the slave node 110. For example, the time synchronizer 170 (or, e.g., the time stamper 330 included in the time synchronizer 170) may be configured to issue an instruction to the CPU 315 included in the slave node 110 to read a present value of the clock 325 and translate the clock value to a numeric format corresponding to a real time (e.g., such as hours, minutes, seconds, fractions of seconds). Referring to the example time sample pair determination procedure 600 of FIG. 6, the first local time stamp determined at block 510 corresponds to a local send time stamp 610, denoted as $s_{send}$. The time synchronizer 170 (or, e.g., the time stamper 330 included in the time synchronizer 170) then stores the first local times stamp (or, e.g., the local send time stamp 610 ($s_{send}$)) for later processing.

Next, after determining the first local times stamp (or, e.g., the local send time stamp 610 ($s_{send}$)), control proceeds to block 515 at which the time synchronizer 170 (or, e.g., the message generator 335 included in the time synchronizer 170) sends a measurement trigger message to the master node 150 over the communication network 140. Referring to FIG. 6, the measurement trigger message corresponds to the measurement trigger message 620 and may optionally include the first local time stamp (or, e.g., the local send time stamp 610 ($s_{send}$)). Returning to FIG. 5, control then proceeds to block 520 at which the time synchronizer 160 determines a reference time measurement associated with the master node 150 in response to receiving the message trigger message. Referring to FIG. 6, the reference time measurement corresponds to the master time stamp 630, denoted as $m_{middle}$. Example machine readable instructions that may be executed to implement block 520 are shown in greater detail in FIG. 7.

Next, control proceeds to block 525 at which the time synchronizer 170 (or, e.g., the message receiver 340 included in the time synchronizer 170) receives the measurement reporting message from the time synchronizer 160 and/or the master node 150 which contains the reference time measurement determined at block 520. Referring to the example of FIG. 6, the measurement reporting message corresponds to the measurement reporting message 640. Returning to block 525 of FIG. 5, the time synchronizer 170 also stores the received reference time measurement for later processing. Control then proceeds to block 530 at which the time synchronizer 170 (or, e.g., time stamper 330 included in the time synchronizer 170) determines a second local time stamp by sampling the local time base associated with the slave node 10 as discussed above in connection with block 510. Referring to the example of FIG. 6, the second local time stamp determined at block 530 corresponds to a local receive time stamp 650, denoted as $s_{recv}$. Control then proceeds to block 535.

At block 535, the time synchronizer 170 (or, e.g., the time sample burst processor 355 included in the time synchronizer 170) whether the time measurement burst for determining the present time sample pair is complete. As discussed previously, multiple time measurements may be performed during the measurement interval corresponding to the present time sample pair to reduce errors associated with, for example, unequal propagation delays for measurement trigger messages and measurement reporting messages, non-negligible internal processing times to determine time measurements, etc. Referring to FIG. 6, an example time measurement burst may include, for example, the group of local and reference time measurements 660 and the subsequent group of local and reference time measurements 670. In such an example, the individual measurement groups are combined as discussed below to determine the time sample pair corresponding to the present measurement interval.

If the time measurement burst is not complete (block 535), control returns to block 510 and blocks subsequent thereto at which another group of first local, second local and reference time stamps is determined (e.g., corresponding to measurement group 670 in FIG. 6). If, however, the measurement burst is complete (block 535) control proceeds to block 540 at which the time synchronizer 170 (or, e.g., the time sample sequence processor 350 included in the time synchronizer 170) computes the difference between each pair of first and second local times stamps (e.g., each pair of $s_{send}$ and $s_{recv}$ measurements) included in the time measurement burst for the present time sample pair being determined. Control then proceeds to block 545 at which the time synchronizer 170 (or, e.g., the time sample sequence processor 350 included in the time synchronizer 170) discards outlier time measurement groups based on the local time stamp differences determined at block 540. For example, measurement groups having local time stamp differences which are significantly larger and/or smaller than the majority, average, etc. of the local time stamp differences may be discarded to improve overall measurement accuracy. Persons of ordinary skill in the art will recognize that the processing performed at blocks 540 and 545 may be bypassed if, for example, the measurement burst includes only one measurement group (e.g., such as including only the measurement group 660 of FIG. 6).

Control next proceeds to block 550 at which the time synchronizer 170 (or, e.g., time stamp averager 345 included in the time synchronizer 170) averages the remaining first and second local time stamps (e.g., the remaining $s_{send}$ and $s_{recv}$ time stamps) obtained during the present measurement interval to determine the averaged local time measurement, $t_{local\_avg,k}$, associated with the present sample instant, k. For example, and referring to FIG. 6, the time synchronizer 170 (or, e.g., time stamp averager 345 included in the time synchronizer 170) may average the first and second local time stamp (e.g., such as the $s_{send}$ and $s_{recv}$ time stamps 610 and 650) included in a measurement group within the measurement burst (e.g., such as the measurement group 660) to determine a local time measurement $t_{local\_meas,i}$ for that group (e.g., such as the local time measurement 680). Then, if the measurement burst includes multiple measurement groups (e.g., such as measurement groups 660 and 670), the time synchronizer 170 (or, e.g., time stamp averager 345 included in the time synchronizer 170) may average the individual local time measurements $t_{local\_meas,i}$ for each measurement group to determine the averaged local time measurement $t_{local\_avg,k}$ for the measurement burst associated with the sampling instant, k (e.g., such as the averaged local time measurement 685, denoted as ($s_{average}$)). However, if the measurement burst includes only one measurement group (e.g., such as measurement group 660), the individual local time measurement $t_{local\_meas,i}$ for the measurement group (e.g., such as the local time measurement 680) may be set to be the averaged local time measurement $t_{local\_avg,k}$.

Next, control proceeds to block 555 at which the time synchronizer 170 (or, e.g., time stamp averager 345 included in the time synchronizer 170) averages the remaining reference time measurements (e.g., the remaining $m_{middle}$ time stamps) obtained during the present measurement interval to determine the averaged master reference time measurement, $t_{master\_avg,k}$, associated with the present sample instant, k. For example, and referring to FIG. 6, the time synchronizer 170 (or, e.g., time stamp averager 345 included in the time synchronizer 170) may set the reference time stamp (e.g., such as the $m_{middle}$ time stamp 630) included in a measurement group within the measurement burst (e.g., such as the measurement group 660) to be the local time measurement $t_{master\_meas,i}$ for that group. Then, if the measurement burst includes multiple measurement groups (e.g., such as measurement groups 660 and 670), the time synchronizer 170 (or, e.g., time stamp averager 345 included in the time synchronizer 170) may average the individual reference time measurements $t_{master\_meas,i}$ for each measurement group to determine the averaged reference time measurement $t_{master\_avg,k}$ for the measurement burst associated with the sampling instant, k (e.g., such as the averaged master reference time measurement 690, denoted as ($m_{average}$)). However, if the measurement burst includes only one measurement group (e.g., such as measurement group 660), the individual reference time measurement $t_{master\_meas,i}$ for the measurement group (e.g., such as the $m_{middle}$ time stamp 630) may be set to be the averaged reference time measurement $t_{master\_avg,k}$.

Finally, control proceeds to block 560 at which the time synchronizer 170 (or, e.g., the time sample sequence processor 350 included in the time synchronizer 170) stores averaged local time measurement $t_{local\_avg,k}$ and the averaged master reference time measurement $t_{master\_avg,k}$ as the time sample pair ($t_{local\_avg,k}$, $t_{master\_avg,k}$) for the present sampling instant k. Execution of the example machine readable instructions 410 then ends.

Figure 7:
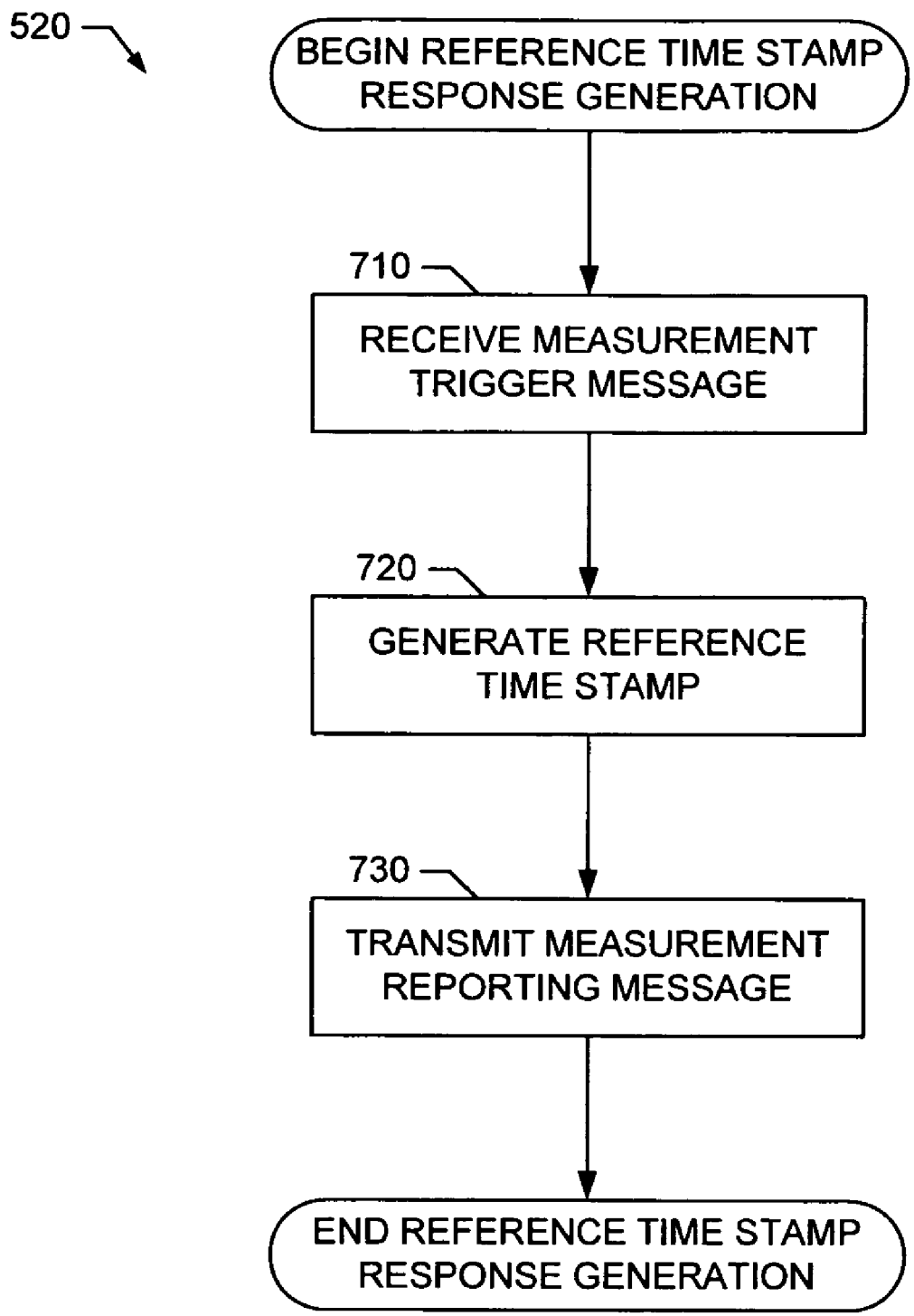
FIG. 7 is a flowchart representative of example machine readable instructions that may be executed, at least in part, to generate time stamp responses for use by the example machine readable instructions of FIG. 4 and/or to implement the example time synchronizer of FIG. 3.

FIG. 7 illustrates example machine readable instructions 520 that may be used to implement block 520 of the example machine readable instructions 410 of FIG. 5. The example machine readable instructions 520 of FIG. 7 operate to determine a time measurement in response to a received measurement trigger message. For simplicity, execution of the machine readable instructions 520 is described from the perspective of the time synchronizer 160 performing reference time measurement determination for the master node 150 in the time synchronization system 100 of FIG. 1. Persons of ordinary skill in the art will recognize that operation of the example machine readable instructions 410 may be adapted to also encompass local time measurement determination performed in response to a received measurement trigger message by any or all of the time synchronizers 170-190 used with respective slave nodes 110-130.

Referring also to the example time sample pair determination procedure 600 of FIG. 6, execution of the example machine readable instructions 520 begins at 710 at which the time synchronizer 160 receives a measurement trigger message (e.g., such as a measurement trigger message sent by the time synchronizer 170 used with the slave node 110). If, for example, the time synchronizer 160 is implemented based on the example of FIG. 3, the message receiver 340 included in the time synchronizer 160 may be configured to receive the message trigger message transmitted, for example, over the communication network 140. Control then proceeds to block 720.

At block 720, the time synchronizer 160 determines a reference time measurement by sampling the time base associated with the master node 150. For example, if the time synchronizer 160 and master node 150 are implemented based on the example of FIG. 3, the time stamper 330 included in the time synchronizer 160 may determine a reference time measurement at block 720 by sampling the clock 325 included in the master node 150. For example, the time synchronizer 160 (or, e.g., the time stamper 330 included in the time synchronizer 160) may be configured to issue an instruction to the CPU 315 included in the master node 150 to read a present value of the clock 325 and translate the clock value to a numeric format corresponding to a real time (e.g., such as hours, minutes, seconds, fractions of seconds). Referring to the example time sample pair determination procedure 600 of FIG. 6, the reference time stamp determined at block 720 corresponds to the reference time stamp 630, denoted as $m_{middle}$. The time synchronizer 160 (or, e.g., the time stamper 330 included in the time synchronizer 160) then stores the reference time measurement (or, e.g., the reference time stamp 630 ($m_{middle}$)).

Control then proceeds to block 730 at which the time synchronizer 160 (or, e.g., the message generator 335 included in the time synchronizer 160) generates a measurement reporting message which includes the reference time measurement determined at block 720. The time synchronizer 160 (or, e.g., the message generator 335 included in the time synchronizer 160) then transmits this measurement reporting message back to the time synchronizer and/or node responsible for the measurement trigger message received at block 710 (e.g., such as time synchronizer 170 and/or slave node 110 in FIG. 1). Execution of the example machine readable instructions 520 then ends.

Figure 8:
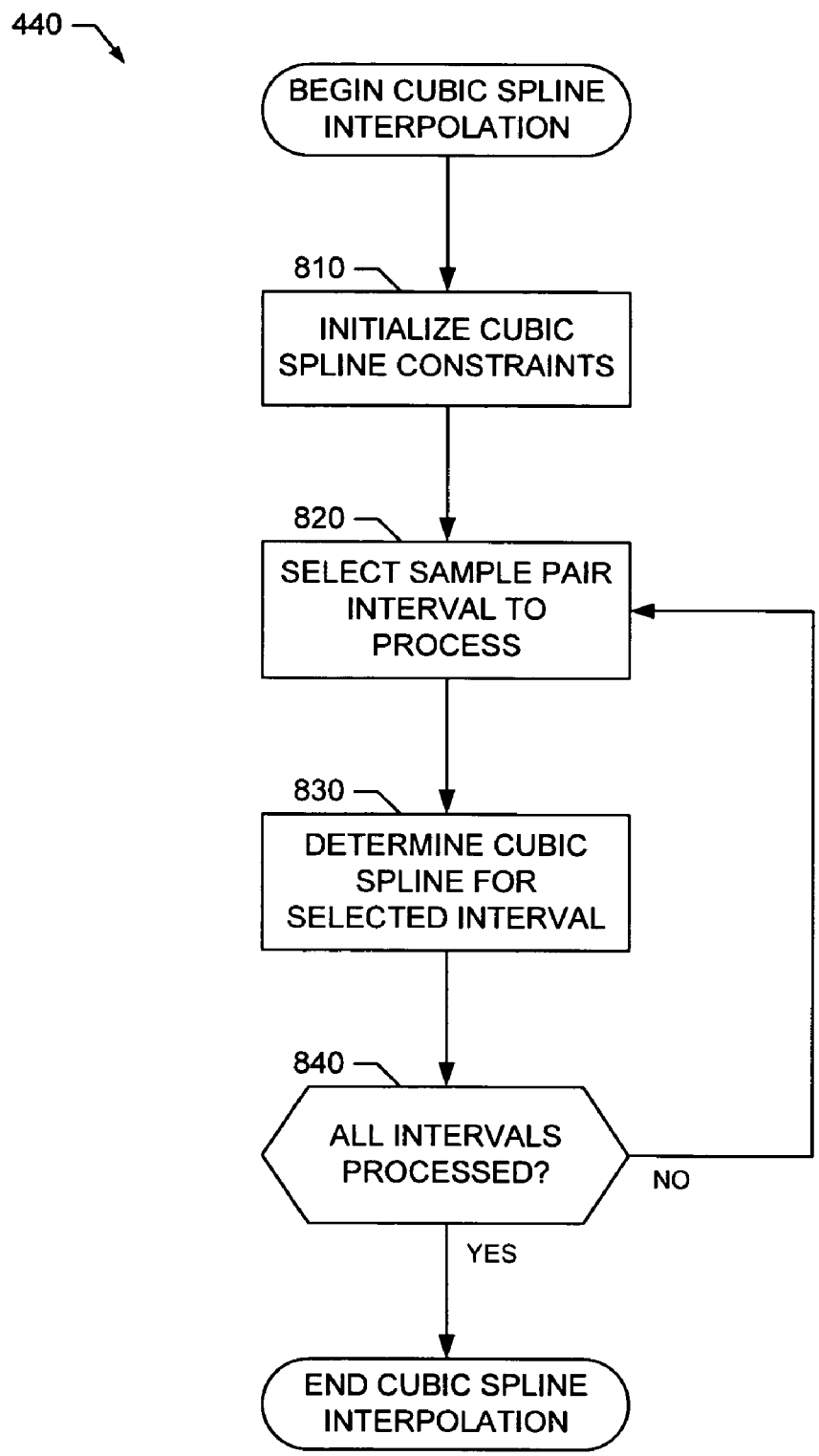
FIG. 8 is a flowchart representative of example machine readable instructions that may be executed, at least in part, to perform cubic spline interpolation for use by the example machine readable instructions of FIG. 4 and/or to implement the example time synchronizer of FIG. 3.

FIG. 8 illustrates example machine readable instructions 440 that may be used to implement block 440 of the example machine readable instructions 400 of FIG. 4. The example machine readable instructions 440 of FIG. 8 operate to determine a sequence of constrained cubic splines to interpolate between adjacent time sample pairs in a sequence of time sample pairs. For example, each time sample pair in the sequence of time sample pairs may relate the local time associated with a slave node (e.g., such as the slave node 110 of FIG. 1) with the reference time associated with a reference time source (e.g., such as the master node 150 of FIG. 1) at a particular sampling instant in time. For simplicity, execution of the machine readable instructions 440 is described from the perspective of the time synchronizer 170 performing cubic spline interpolation locally for the slave node 110 in the time synchronization system 100 of FIG. 1. Persons of ordinary skill in the art will recognize that operation of the example machine readable instructions 440 may be adapted to encompass cubic spline interpolation performed locally by any or all of the time synchronizers 170-190 used with respective slave nodes 110-130 in the time synchronization system 100. Additionally or alternatively, the example machine readable instructions 440 may be adapted to encompass cubic spline interpolation performed centrally by the time synchronizer 160 used with respective master node 150 in the time synchronization system 100.

For reference, and as discussed above in connection with FIG. 4, prior to execution of the example machine readable instructions 440, the time synchronizer 170 has determined a sequence of time sample pairs $(t_{local\_avg,0}, t_{master\_avg,0})$, $(t_{local\_avg,1}, t_{master\_avg,1}), \ldots, (t_{local\_avg,n}, t_{master\_avg,n})$. Each pair of adjacent time sample pairs, $(t_{local\_avg,k}, t_{master\_avg,k})$, $(t_{local\_avg,k+1}, t_{master\_avg,k+1})$, forms a non-overlapping time interval in the time-domain spanned by the sequence of time sample pairs. The example machine readable instructions 440 enable the time synchronizer 170 to determine a sequence of n constrained cubic splines, denoted as $f_1(t), f_2(t), \ldots, f_n(t)$, with each spline corresponding to one of the n non-overlapping time intervals. In particular, the cubic spline $f_k(t)$ corresponding to the time interval having endpoints equal to the adjacent time sample pairs $(t_{local\_avg,k}, t_{master\_avg,k})$, $(t_{local\_avg,k+1}, t_{master\_avg,k+1})$ is generated to interpolate between these time sample pairs within this time interval.

Returning to FIG. 8, and referring to FIG. 1, execution of the example machine readable instructions 440 begins at block 810 at which the time synchronizer 170 initializes the constraints used to generate the sequence of constrained cubic splines to interpolate between adjacent time sample pairs in the sequence of time sample pairs. If, for example, the time synchronizer 170 is implemented based on the example of FIG. 3, the interpolator 360 included in the time synchronizer 170 may perform the initialization at block 810. For example, at block 810 the time synchronizer 170 (or. e.g., the interpolator 360 included in the time synchronizer 170) may be configured to initialize the cubic spline constraints according to the interpolation techniques described by Kruger in "Constrained Cubic Spline Interpolation for Chemical Engineering Applications," available at www.korf.co.uk/spline.pdf. Examples of constraints which may be initialized at block 810 include:

CONSTRAINT 1: requiring adjacent constrained cubic splines corresponding to adjacent non-overlapping intervals to have substantially equal first derivatives at the common endpoint shared by the adjacent intervals; or CONSTRAINT 2: requiring each constrained cubic spline to output values not exceeding a range bounded by the adjacent time sample pairs defining the endpoints of the interval corresponding to the constrained cubic spline; or CONSTRAINT 3: requiring the first and last constrained cubic spline in the sequence of cubic splines to have first derivatives at their outermost endpoints to be substantially equal to a slope of a line constructed to interpolate between the entire sequence of time sample points (e.g., corresponding to natural splines).

As discussed by Kruger, other possible initial constraints may be used, such as, but not limited to: requiring adjacent constrained cubic splines corresponding to adjacent non-overlapping intervals to have substantially equal second derivatives at the common endpoint shared by the adjacent intervals and/or endpoint constraints associated with the outermost splines in the sequence of constrained splines to yield parabolic runout splines, cubic runout splines, clamped splines, etc.

After initialization completes at block 810, control proceeds to block 820 at which the time synchronizer 170 (or. e.g., the interpolator 360 included in the time synchronizer 170) selects the next sample pair interval to be processed. For example, the selected sample pair interval to be processed may have endpoints corresponding to the adjacent time sample pairs $(t_{local\_avg,k-1}, t_{master\_avg,k-1})$ and $(t_{local\_avg,k}, t_{master\_avg,k})$. Control then proceeds to block 830 at which the time synchronizer 170 (or, e.g., the interpolator 360 included in the time synchronizer 170) determines the constrained cubic spline corresponding to the interval selected at block 820. For example, the constrained cubic spline corresponding to the interval defined by the adjacent time sample pairs $(t_{local\_avg,k-1}, t_{master\_avg,k-1})$ and $(t_{local\_avg,k}, t_{master\_avg,k})$ is:

$$f_k(t) = a_k + b_k t + c_k t^2 + d_k t^3,$$

where $a_k$, $b_k$, $c_k$ and $d_k$ are all constants associated with the selected interval.

Thus, at block 830, the time synchronizer 170 (or. e.g., the interpolator 360 included in the time synchronizer 170) determines the constrained cubic spline for the selected interval (e.g., $f_k(t)$) by solving for the constants which define the spline (e.g., $a_k$, $b_k$, $c_k$ and $d_k$) according to the constraints set at block 810. For example, as discussed in Kruger, CONSTRAINTS 1 and 2 may be satisfied by setting the first derivative at the endpoints of each cubic spline to be equal to the following function:

$$f'_k(x_k) = f'_{k+1}(x_k) =$$

$$f'(x_k) = \begin{cases} 0 & \text{if slope changes sign at point} \\ \dfrac{2}{\dfrac{x_{k+1} - x_k}{y_{k+1} - y_k} + \dfrac{x_k - x_{k-1}}{y_k - y_{k-1}}} & \text{otherwise} \end{cases}$$

In the preceding and following equations for $f'(x_k)$, $x_k$ corresponds to $t_{local\_avg,k}$ and $y_k$ corresponds to $t_{master\_avg,k}$. Kruger defines additional functions $f_1'(x_0)$ and $f_n'(x_n)$ to satisfy CONSTRAINT 3 associated with the first derivatives at the endpoints of the first and last constrained cubic spline in the sequence of cubic splines. For example, these functions may be given by the mathematical expressions:

$$f'_1(x_0) = \frac{3(y_1 - y_0)}{2(x_1 - x_0)} - \frac{f'(x_1)}{2}$$

and $$f'_n(x_n) = \frac{3(y_n - y_{n-1})}{2(x_n - x_{n-1})} - \frac{f'(x_{n-1})}{2}$$

where, again, $x_k$ corresponds to $t_{local\_avg,k}$ and $y_k$ corresponds to $t_{master\_avg,k}$. Based on these functions, and the time sample pairs which define the selected interval and the non-overlapping intervals on either side of the selected interval, persons of ordinary skill in the art will recognize that constants which define the spline for the selected (e.g., $a_k$, $b_k$, $c_k$ and $d_k$) may be determined by solving a system of equations. Alternatively, as discussed in Kruger, the equations provided above may be manipulated to provide mathematical expressions that allow determination of the constants (e.g., $a_k$, $b_k$, $c_k$ and $d_k$) directly.

After the constrained cubic spline for the selected interval is determined at block 830, control proceeds to block 840 at which the time synchronizer 170 (or. e.g., the interpolator 360 included in the time synchronizer 170) determines whether all constrained cubic splines associated with all non-overlapping intervals defined by the sequence of time sample pairs have been determined. If all the constrained cubic splines have not yet been determined (block 840), control returns to block 820 and blocks subsequent thereto at which the time synchronizer 170 (or. e.g., the interpolator 360 included in the time synchronizer 170) selects the next non-overlapping interval and determines the constrained cubic spline for that interval. However, if all the constrained cubic splines have been determined (block 840), execution of the example machine readable instructions 440 then ends.

Figure 9:
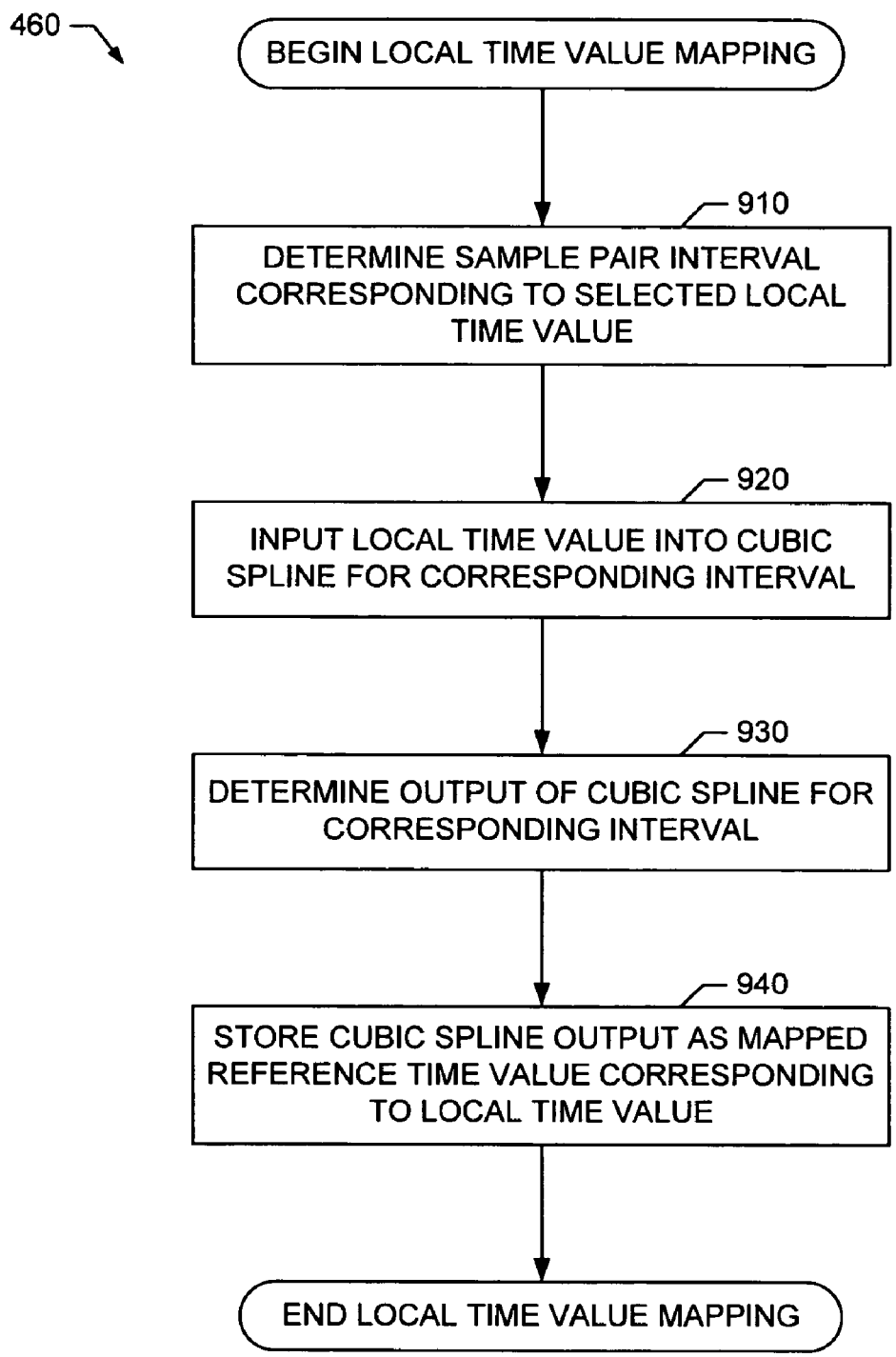
FIG. 9 is a flowchart representative of example machine readable instructions that may be executed, at least in part, to map local time values to reference time values for use by the example machine readable instructions of FIG. 4 and/or to implement the example time synchronizer of FIG. 3.

FIG. 9 illustrates example machine readable instructions 460 that may be used to implement block 460 of the example machine readable instructions 400 of FIG. 4. The example machine readable instructions 460 of FIG. 9 operate to map a local time value associated with, for example, a slave node (e.g., such as the slave node 110 of FIG. 1) to a corresponding reference time value associated with, for example, a reference time source (e.g., such as the master node 150 of FIG. 1). For simplicity, execution of the machine readable instructions 440 is described from the perspective of the time synchronizer 170 performing time mapping locally for the slave node 110 in the time synchronization system 100 of FIG. 1. Persons of ordinary skill in the art will recognize that operation of the example machine readable instructions 440 may be adapted to encompass time mapping performed locally by any or all of the time synchronizers 170-190 used with respective slave nodes 110-130 in the time synchronization system 100. Additionally or alternatively, the example machine readable instructions 440 may be adapted to encompass time mapping performed centrally by the time synchronizer 160 used with respective master node 150 in the time synchronization system 100.

For reference, and as discussed above in connection with FIG. 4, the example machine readable instructions 460 operate to map a local time value $t_{local}$ to a corresponding reference time $t_{master}$ based on a constrained cubic spline interpolation generated by, for example, the machine readable instructions 440 of FIG. 8 to interpolate between time sample pairs in the sequence of time sample pairs. Returning to FIG. 9, and referring to FIG. 1, the example machine readable instructions 460 begin execution at block 910 at which the time synchronizer 170 determines the non-overlapping sample interval in which the local time value $t_{local}$ lies. If, for example, the time synchronizer 170 is implemented based on the example of FIG. 3, the time mapper 365 included in the time synchronizer 170 may perform the determination at block 910. For example, at block 910 the time synchronizer 170 (or, e.g., the time mapper 365 included in the time synchronizer 170) may determine that the local time value $t_{local}$ lies in the interval defined by the adjacent time sample pairs $(t_{local\_avg,m-1}, t_{master\_avg,m-1})$ and $(t_{local\_avg,m}, t_{master\_avg,m})$.

Next, control proceeds to block 920 at which the time synchronizer 170 (or, e.g., the time mapper 365 included in the time synchronizer 170) selects the particular constrained cubic spline corresponding to the interval determined at block 910. For example, the constrained cubic spline $f_m(t)$ may be selected corresponding to the interval defined by the adjacent time sample pairs $(t_{local\_avg,m-1}, t_{master\_avg,m-1})$ and $(t_{local\_avg,m}, t_{master\_avg,m})$ in which the local time value $t_{local}$ lies. The time synchronizer 170 (or, e.g., the time mapper 365 included in the time synchronizer 170) then inputs the local time value (e.g., $t_{local}$) into the selected cubic spline ($f_m(t)$). Control then proceeds to block 930 at which the time synchronizer 170 (or, e.g., the time mapper 365 included in the time synchronizer 170) evaluates the output of the selected constrained cubic spline corresponding to the input local time value (e.g., $f_m(t_{local})$). Finally, control proceeds to block 940 at which the time synchronizer 170 (or, e.g., the time mapper 365 included in the time synchronizer 170) stores the resulting output of the cubic spline as the reference time $t_{master}$ corresponding to the local time value $t_{local}$ (i.e., $t_{master} = f_m(t_{local})$). Execution of the example machine readable instructions 460 then ends.

Figure 10:
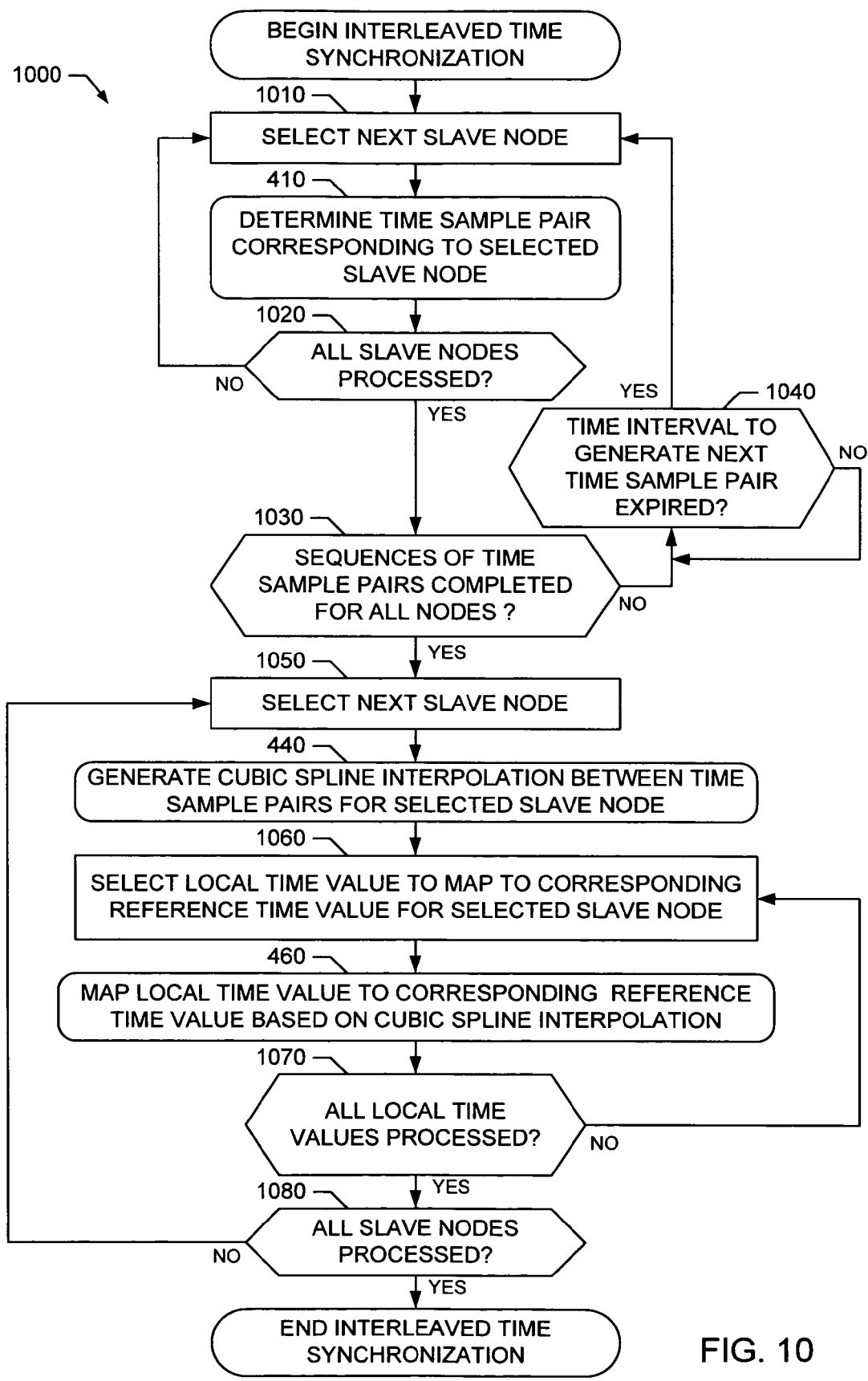
FIG. 10 is a flowchart representative of second example machine readable instructions that may be executed, at least in part, to implement the example time synchronizer of FIG. 3 and/or implement interleaved local time synchronization in the example system of FIG. 1.

Second example machine readable instructions 1000 that may be executed, at least in part, to implement the example time synchronization system 100 of FIG. 1 are shown in FIG. 10. As such, at least portions of the example machine readable instructions 1000 may be executed by one or more time synchronizers, such as the time synchronizers 160-190 or the example time synchronizer 300 of FIG. 3, to perform time synchronization in the time synchronization system 100. The example machine readable instructions 1000 may be executed whenever local time synchronization is to be performed centrally at a reference time source, such as the master node 150 in the time synchronization system 100. Thus, the example machine readable instructions 1000 enable a time synchronizer, such as the time synchronizers 160 in the time synchronization system 100, to map a local time value, $t_{local}$, associated with a slave node, such as any or all of the slave nodes 110-130 in the time synchronization system 100, to a corresponding master reference time, $t_{master}$, associated the master node 150, the reference time source in the time synchronization system 100. For simplicity, execution of the machine readable instructions 1000 is described from the perspective of the time synchronizer 160 performing local time synchronization for the master node 150 in the time synchronization system 100.

Referring to FIGS. 1 and 10, the machine readable instructions 1000 begin execution at block 1010 at which the time synchronizer selects one of the slave nodes 110-130 in the time synchronization system 100 for which time measurements are to be determined. As discussed in the following, the selection at block 1010 of the particular slave node 110-130 is performed in an interleaved manner. Control next proceeds to block 410 at which the time synchronizer 160 determines a time sample pair used to relate local time associated with the selected slave node 110-130 with reference time associated with the master node 150 at a particular sampling instant in time. For example, the time sample pair for sampling instant k corresponding to slave node j may be denoted as $(t_{local\_avg,j,k}, t_{master\_avg,j,k})$ and be determined by the time synchronizer 150 by averaging individual local and reference time measurements, denoted as $t_{local\_meas,j,i}$ and $t_{master\_meas,j,i}$, respectively, obtained during a measurement interval associated with the sample instant, k.

Example machine readable instructions that may be executed to implement block 410 are shown in greater detail in FIG. 5 above. Previously, the example machine readable instructions 410 were described in connection with the example machine readable instructions 400 that operate to perform local time synchronization locally at, for example, a slave node. In that example, the portions of the machine readable instructions 410 represented by blocks 510, 515, and 525-560 are executed by, for example, the time synchronizer 170 used with a slave node 110 to: (1) obtain first and second local time stamps, (2) generate measurement trigger messages, (3) receive measurement reporting messages, (4) determine the averaged local time measurement by averaging the first and second local time stamps (possibly over a measurement burst) and (5) determine the averaged reference time measurement (possibly over a measurement burst). Additionally in that example, the portions of the machine readable instructions 410 corresponding to block 520 are executed by, for example, the time synchronizer 160 used with the master mode 150 to generate and report a reference time measurement in response to a received measurement trigger message. Now, in the example of FIG. 10 in which time synchronization is performed centrally, the operation of the machine readable instructions 410 remains unchanged, but the time synchronizers executing specific portions of the machine readable instructions is reversed. Thus, at block 410 of FIG. 10, the portions of the machine readable instructions 410 of FIG. 5 represented by blocks 510, 515, and 525-560 are now executed by the time synchronizer 160 used with the master node 150 to: (1) obtain first and second reference time stamps, (2) generate measurement trigger messages, (3) receive measurement reporting messages, (4) determine the averaged reference time measurement by averaging the first and second reference time stamps (possibly over a measurement burst) and (5) determine the averaged local time measurement (possibly over a measurement burst). Additionally, at block 410, the portions of the machine readable instructions 410 of FIG. 5 corresponding to block 520 are now executed by the appropriate time synchronizer 170-190 used with the slave mode 110-130 selected at block 1010 to generate and report a local time measurement in response to a received measurement trigger message.

After the time sample pair $(t_{local\_avg,j,k}, t_{master\_avg,j,k})$ is determined at block 410, control proceeds to block 1020 which the time synchronizer 160 determines whether time sample pairs have been determined for all slave nodes for the present sampling instant, k. If all slave nodes have not been processed (block 1020), control returns to block 1010 and blocks subsequent thereto at which another slave node 110-130 is selected for time measurement determination. As such, time sample pairs for each slave node 110-130 for a particular sampling instant k are determined in an interleaved fashion before proceeding to the next sampling instant k+1. However, if all slave nodes have been processed (block 1020), control proceeds to block 1030. Persons of ordinary skill in the art will recognize that the interleaving performed by the implementation illustrated in blocks 1010, 410 and 1020 is performed on a per slave node basis. Persons of ordinary skill in the art will appreciate that a variation of the implementation illustrated by blocks 1010, 410 and 1020 could further interleave the transmission of measurement trigger messages to each slave node 110-130, resulting in a corresponding interleaving of reception of measurement reporting messages from the slave nodes 110-130. For example, blocks 1010, 410 and 1020 could be replaced with: (1) a first control loop to transmit measurement trigger messages to each slave node 110-130 and (2) a second control loop to receive measurement reporting messages from each slave node 110-130 and determine the time sample pair associated with each slave node as its corresponding measurement reporting message is received.

At block 1030, the time synchronizer 160 determines whether a complete sequence of time sample pairs has been obtained for all slave nodes 110-130. Complete sequences of time samples may correspond, for example, to a predetermined time domain over which local time synchronization is to be performed. If the time synchronizer 160 is implemented based on the example of FIG. 3, the time sample sequence processor 350 included in the time synchronizer 16- may perform the determination at block 1030. If the sequences of time sample pairs are not complete (block 1030), control proceeds to block 1040 at which the time synchronizer 160 (or, e.g., the time sample sequence processor 350 included in the time synchronizer 160) waits until the next measurement interval at which the next time sample pairs are to be determined for each slave node 110-130. After waiting the appropriate time (block 1040), control returns to block 1010 at which the time synchronizer 160 selects one of the slave nodes 110-130 and determines the next time sample pair to be included in the sequence of time sample pairs for the selected slave node.

However, if the sequences of time sample pairs are complete (block 1030), control proceeds to block 1050 at which the time synchronizer 160 selects one of the slave nodes 110-130 for which local time mapping is to be performed. Control then proceeds to block 440 at which the time synchronizer 160 generates constrained cubic splines to interpolate between adjacent time sample pairs in the sequence of time sample pairs corresponding to the slave node 110-130 selected at block 1050. If the time synchronizer 160 is implemented based on the example of FIG. 3, the interpolator 360 included in the time synchronizer 160 may perform the interpolation at block 440. For example, prior to execution of block 440, the time synchronizer 160 has determined a sequence of time sample pairs $(t_{local\_avg,j,0}, t_{master\_avg,j,0})$, $(t_{local\_avg,j,1}, t_{master\_avg,j,1}), \ldots, (t_{local\_avg,j,n}, t_{master\_avg,j,n})$ for the $j^{th}$ slave node. Each pair of adjacent time sample pairs, $(t_{local\_avg,j,k}, t_{master\_avg,j,k})$, $(t_{local\_avg,j,k+1}, t_{master\_avg,j,k+1})$, forms a non-overlapping time interval in the time-domain spanned by the sequence of time sample pairs for the $j^{th}$ slave node. Then, at block 440, the time synchronizer 160 (or, e.g., the interpolator 360 included in the time synchronizer 160) determines a sequence of n constrained cubic splines for the $j^{th}$ slave node, denoted as $f_{j,1}(t), f_{j,2}(t), \ldots, f_{j,n}(t)$, with each spline corresponding to one of the n non-overlapping time intervals. In particular, the cubic spline $f_{j,k}(t)$ corresponding to the time interval having endpoints equal to the adjacent time sample pairs $(t_{local\_avg,j,k}, t_{master\_avg,j,k})$, $(t_{local\_j,k+1}, t_{master\_avg,j,k+1})$ is generated to interpolate between these time sample pairs within this time interval. Example machine readable instructions that may be executed to implement block 440 are shown in greater detail in FIG. 8 discussed above.

After processing at block 440 completes, control proceeds to block 1060 at which the time synchronizer 160 selects a local time value $t_{local,j}$ associated with the selected slave node 110-130 to be mapped to a corresponding master reference time $t_{master,j}$ associated with the master node 150. For example, referring to the example application 200 of FIG. 2, the local time value $t_{local,j}$ may correspond to a processing time of interest at the selected slave node 110-130 such as when the selected slave node 110-130 commences processing, enters an idle mode, etc. Control then proceeds to block 460 at which the time synchronizer 160 maps the local time value $t_{local,j}$ to the corresponding reference time $t_{master,j}$ based on the constrained cubic spline interpolation generated at block 440 and corresponding to the slave node 110-130 selected at block 1050. If the time synchronizer 160 is implemented based on the example of FIG. 3, the time mapper 365 included in the time synchronizer 160 may perform the mapping at block 460. For example, the time synchronizer 160 (or, e.g., the time mapper 365 included in the time synchronizer 160) may select the particular constrained cubic spline $f_{j,m}(t)$ corresponding to the non-overlapping time interval in which the local time value $t_{j,local}$ lies. The time synchronizer 160 (or, e.g., the time mapper 365 included in the time synchronizer 160) may then evaluate the selected constrained cubic spline $f_{j,m}(t)$ to determine the reference time $t_{master,j}$ corresponding to the local time value $t_{local,j}$ (i.e., $t_{master,j} = f_{j,m}(t_{local,j})$). Example machine readable instructions that may be executed to implement block 460 are shown in greater detail in FIG. 9 discussed above.

After the mapping at block 460 completes, control proceeds to block 470 at which the time synchronizer 160 (or, e.g., the time mapper 365 included in the time synchronizer 160) determines whether there are additional local time values to be mapped to corresponding reference time values for the slave node 110-130 selected at block 1050. If there are additional local time values to be mapped (block 1070), control returns to block 1060 and blocks subsequent thereto at which the time synchronizer selects another local time value $t_{local,j}$ for the selected slave node 110-130 and maps this local time value to a corresponding reference time value $t_{master,j}$. If, however, all local time values have been mapped (block 1070), control proceeds to block 1080 at which the time synchronizer determines whether there are additional slave nodes for which local time values are to be mapped to corresponding reference time values. If there are additional slave nodes to process (block 1080), control returns to block 1050 and blocks subsequent thereto at which the time synchronizer 160 selects another slave node 110-130 and maps local time values to corresponding reference time values for the selected slave node 110-130. However, if local time values for all slave nodes have been mapped (block 1080), execution of the example machine readable instructions 1000 ends.

The local time synchronization techniques described herein can yield significantly better accuracy than existing synchronization techniques. For example, in an example implementation of the time synchronization system 100 in which each node 110-130 and/or 150 includes a single Intel Xeon CPU with 512 MB of RAM operating at 2.8 GHz and the communication network 140 is implemented via a Myrinet high-speed interconnect and Gigabit Ethernet, accuracy more than 1000 times better than the existing Network Time Protocol (NTP) was observed. NTP is described in Internet Request for Comment (RFC) 1305, available at http:www.ietf.org/rfc.html. For example, in such a system, time synchronization by mapping local time values associated with slave nodes to reference time values associated with a master node yielded error offsets as large as 5 ms for NTP, whereas the techniques disclosed herein yielded errors of at most 3 µs and less than 1 µs on average. One of the reasons for the significant performance improvement is that the disclosed techniques employ accurate constrained cubic spline interpolation based on time measurements occurring before and after the local time value to be mapped. NTP, on the other hand, employs less accurate linear extrapolation based on time measurements occurring before the local time value to be mapped, because NTP focuses on determining future clock adjustments needed to align a local time source with a reference time source.

Figure 11:
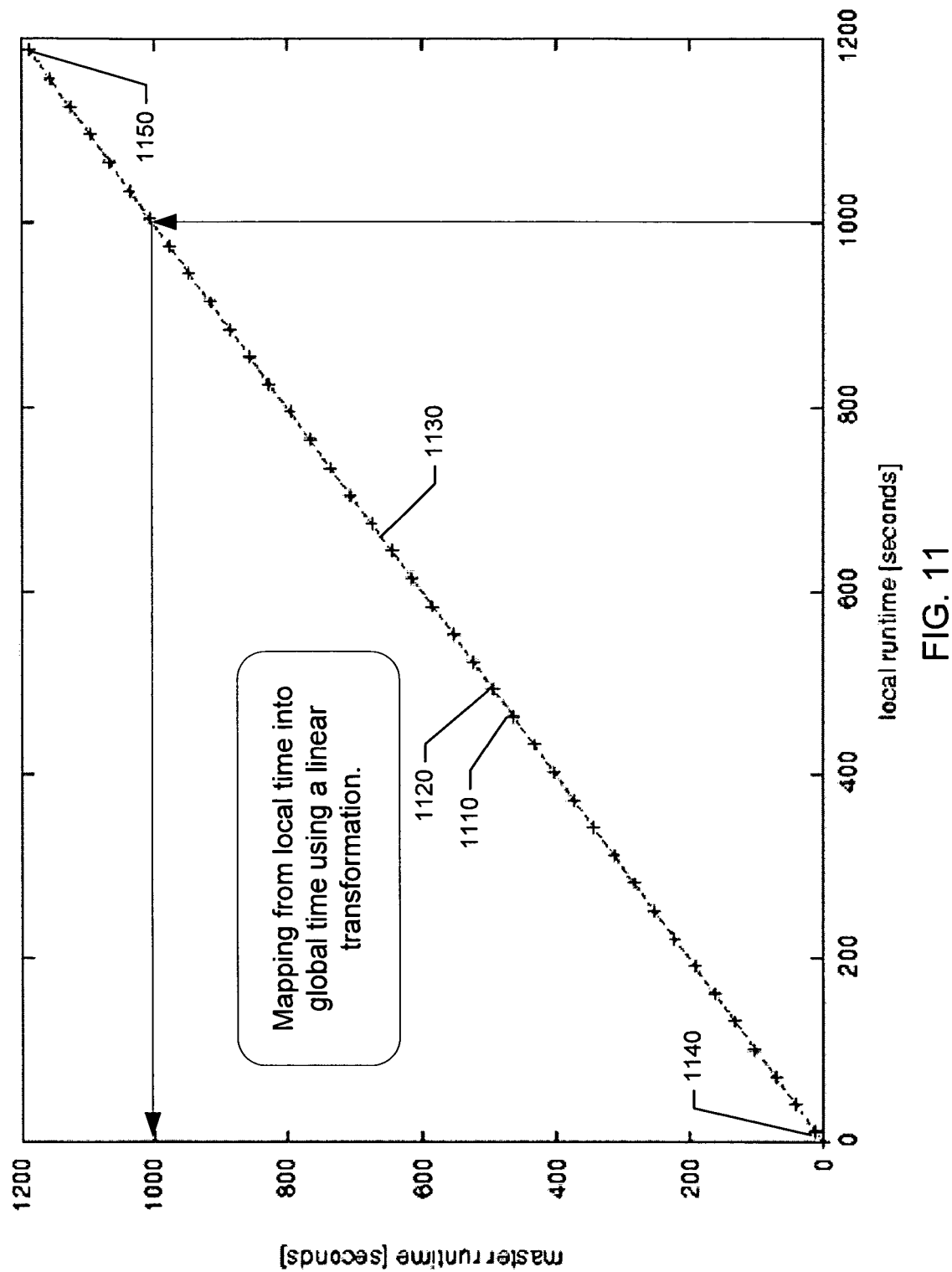
FIG. 11 provides a coarse scale illustration of an example interpolation consistent with prior-art time synchronization techniques.

On a coarse scale over a long time interval, the time synchronization accuracy improvement of the disclosed techniques may at first not be readily apparent. For example, FIG. 11 provides a coarse scale illustration of the mapping of local time values (the horizontal axis) to corresponding reference time values (the vertical axis) over an extended period of time. Individual time sample pairs (e.g., such as the time sample pairs 1110 and 1120) corresponding to local time measurements and corresponding reference time measurements are represented by "+" signs on the graph. The graph in FIG. 11 depicts a linear interpolation curve 1130 corresponding to a single linear interpolation function between the first and last time sample pairs 1140 and 1150. Traditional time synchronization techniques may map from local time to reference time by evaluating the same single linear interpolation curve 1130 (in contrast to the time synchronization techniques disclosed herein that employ multiple, separate interpolation functions between adjacent time sample pairs). As can be seen from FIG. 11, on a coarse scale the differences between the individual time sample pairs (e.g., the "+" signs) and corresponding points on the single linear interpolation curve 1130 are not readily discernible in the graph. Thus, on a coarse scale, it may not be readily apparent how employing separate interpolation functions between time sample pairs, as in the example techniques disclosed herein, would provide any appreciable difference over the single linear interpolation curve 1130.

Figure 12:
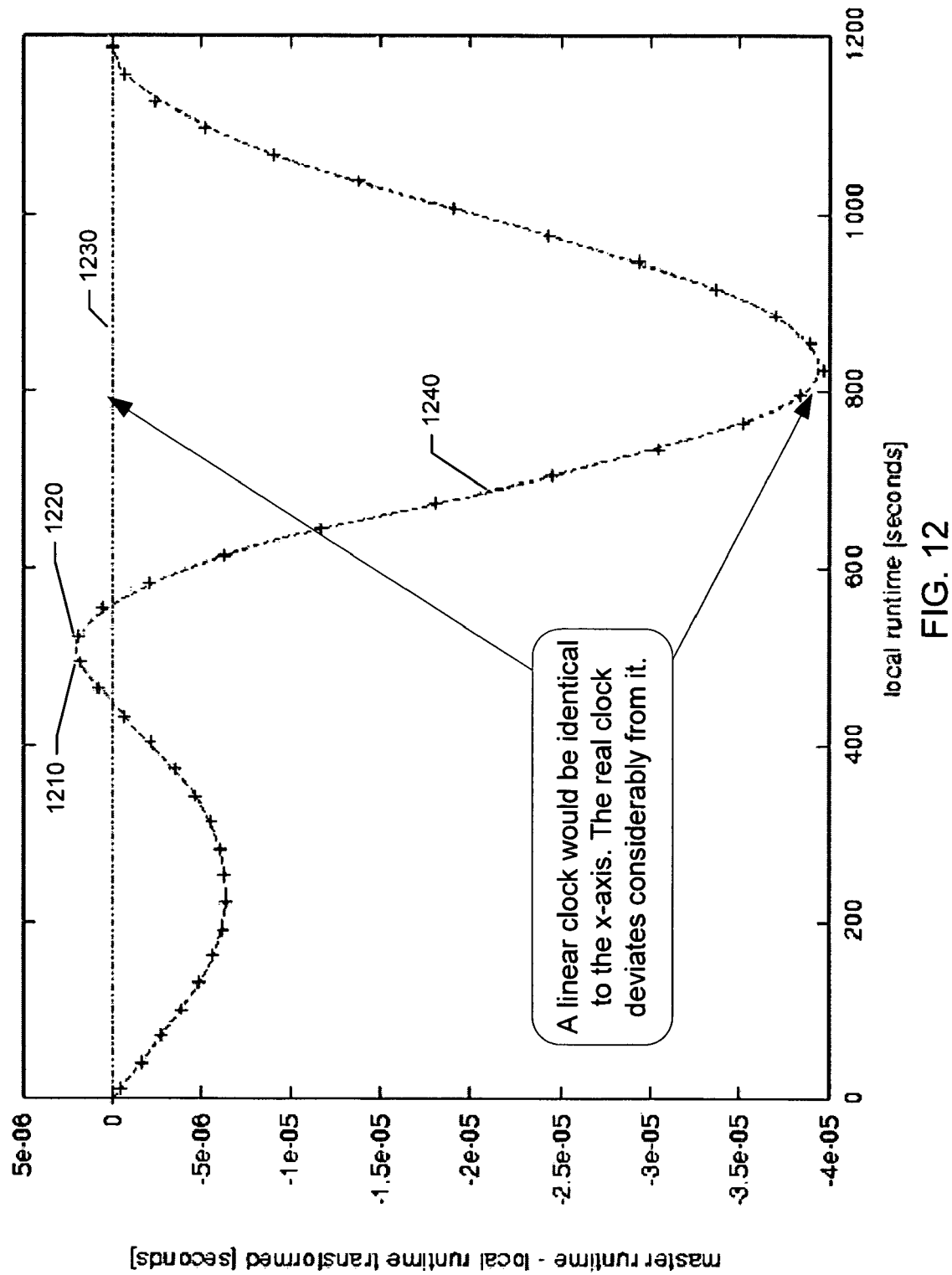
FIG. 12 provides a fine scale illustration of an example interpolation performed by the example time synchronizer of FIG. 3 and/or the example machine readable instructions of FIG. 4 to map local time values to reference time values in the example system of FIG. 1.

However, as shown in FIG. 12, on a finer scale the differences between individual time sample pairs and corresponding points on a single linear interpolation curve can be considerable. In FIG. 12, similar to FIG. 11, local time values correspond to the horizontal axis, but in FIG. 12 the vertical axis corresponds to reference time values normalized by the linear interpolation function 1130 of FIG. 11. As such, the linear interpolation curve 1130 of FIG. 11 corresponds essentially to the horizontal axis 1230 of FIG. 12. If the local time source and reference time source possessed a perfectly linear relationship (e.g., as assumed by prior time synchronization techniques), the time sample pairs (e.g., such as the time sample pairs 1210 and 1220) which include local time measurements and corresponding reference time measurements would all lie on the horizontal axis 1230 (e.g., indicating no error between local time values and reference time values). However, in an actual system, the local time source and reference time source will deviate from each other due to, for example, clock drift, jitter, etc., as shown by the varying curve of measured time sample pairs (e.g., including time sample pairs 1210 and 1220). The horizontal axis 1230, corresponding essentially to the single linear interpolation curve 1130 based on just the two outermost time sample pairs, shows that prior time synchronization techniques are unable to track the small deviations between the local time source and the reference time source. On the other hand, the constrained spline interpolation curve 1240 shows that the techniques disclosed herein are able to track these deviations. Furthermore, FIG. 12 illustrates the cubic nature of the interpolation between time sample pairs (e.g., such as the cubic nature of the interpolation between the time sample pairs 1210 and 1220).

Figure 13:
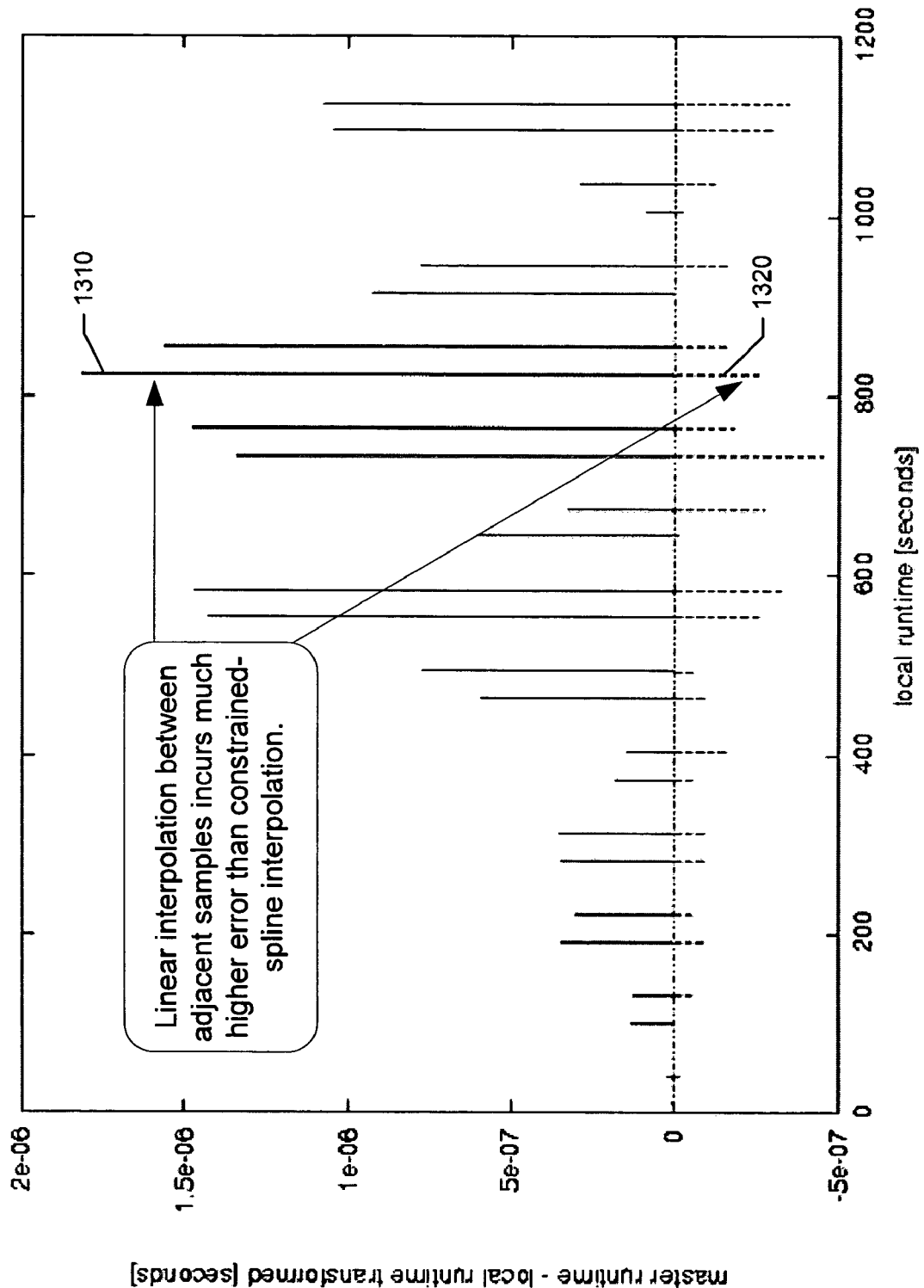
FIG. 13 provides an illustration of time mapping accuracy achieved by the techniques disclosed herein for an example implementation based on constrained cubic spline interpolation compared with another example implementation based on linear interpolation between time sample pair measurements.

FIG. 13 compares the use of constrained cubic spline interpolation and the use of linear interpolation instead of cubic spline interpolation in the example time synchronization techniques disclosed herein. Specifically, FIG. 13 depicts an example of the absolute error 1310 associated with linear interpolation between time sample pairs (in contrast to linear interpolation between just the first and last time sample pairs as illustrated by curves 1130 and 1230) and the absolute error 1320 associated with constrained cubic spline interpolation between time sample pairs. In order to determine the absolute errors shown in FIG. 13, only every third time sample pair in the sequence of time sample pairs was used to construct the linear interpolation and the constrained cubic spline interpolation. The remaining two of every three time sample pairs were used to evaluate the performance of the linear interpolation and the constrained cubic spline interpolation relative to these actual time sample pair measurements. The absolute error 1310 associated with linear extrapolation is mapped to positive values and the absolute error 1320 associated with constrained cubic spline interpolation is mapped to negative values in FIG. 13. As can be seen, the absolute error 1320 associated with constrained cubic spline interpolation is considerably less than the absolute error 1310 associated with linear interpolation.

Figure 14:
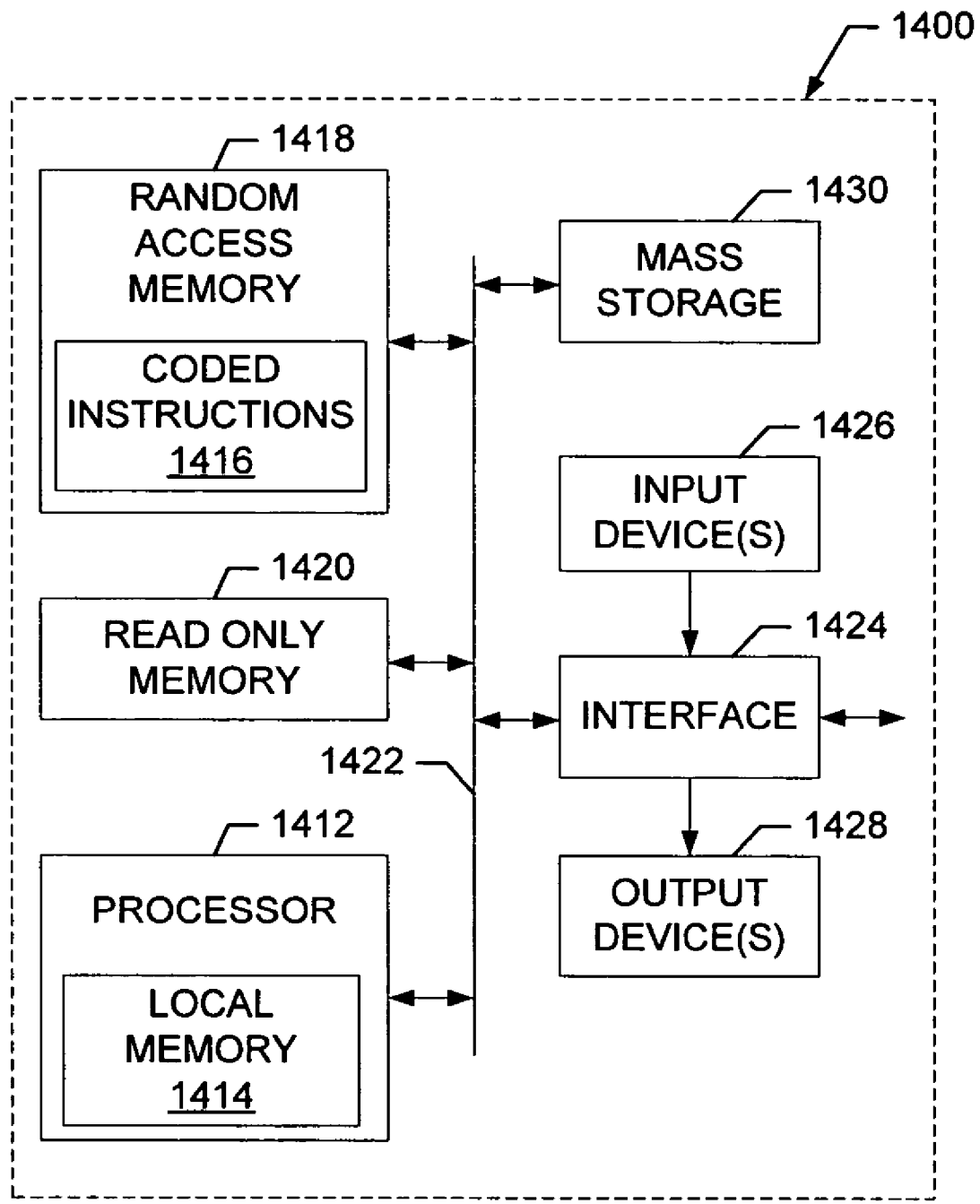
FIG. 14 is a block diagram of an example computer that may execute at least portions of the example machine readable instructions of FIGS. 4, 5, 7, 8, 9 and/or 10 to implement the example time synchronizer of FIG. 3 and/or implement local time synchronization in the example system of FIG. 1.

FIG. 14 is a block diagram of an example computer 1400 capable of implementing the apparatus and methods disclosed herein. The computer 1400 can be, for example, a server, a personal computer, a personal digital assistant (PDA), an Internet appliance, a DVD player, a CD player, a digital video recorder, a personal video recorder, a set top box, or any other type of computing device.

The system 1400 of the instant example includes a processor 1412 such as a general purpose programmable processor. The processor 1412 includes a local memory 1414, and executes coded instructions 1416 present in the local memory 1414 and/or in another memory device. The processor 1412 may execute, among other things, the machine readable instructions represented in FIGS. 4-5 and 7-10. Additionally or alternatively, the processor 1412 may be used to implement, for example, the CPU 315 of FIG. 3. Furthermore, the processor 1412 may be any type of processing unit, such as one or more microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 1412 is in communication with a main memory including a volatile memory 1418 and a non-volatile memory 1420 via a bus 1422. The volatile memory 1418 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1420 may be implemented by flash memory and/or any other desired type of memory device. Access to the main memory 1418, 1420 is typically controlled by a memory controller (not shown) in a conventional manner.

The computer 1400 also includes a conventional interface circuit 1424. The interface circuit 1424 may be implemented by any type of well known interface standard, such as an Ethernet interface, a universal serial bus (USB), and/or a third generation input/output (3 GIO) interface.

One or more input devices 1426 are connected to the interface circuit 1424. The input device(s) 1426 permit a user to enter data and commands into the processor 1412. The input device(s) can be implemented by, for example, a keyboard, a mouse, a touchscreen, a track-pad, a trackball, an isopoint and/or a voice recognition system.

One or more output devices 1428 are also connected to the interface circuit 1424. The output devices 1428 can be implemented, for example, by display devices (e.g., a liquid crystal display, a cathode ray tube display (CRT)), by a printer and/or by speakers. The interface circuit 1424, thus, typically includes a graphics driver card.

The interface circuit 1424 also includes a communication device such as a modem or network interface card to facilitate exchange of data with external computers via a network (e.g., an Ethernet connection, a digital subscriber line (DSL), a telephone line, coaxial cable, a cellular telephone system, etc.). As such, the interface circuit 1424 may be used, for example, to implement the communication interface 320 of FIG. 3.

The computer 1400 also includes one or more mass storage devices 1430 for storing software and data. Examples of such mass storage devices 1430 include floppy disk drives, hard drive disks, compact disk drives and digital versatile disk (DVD) drives. The mass storage device 1430 and/or the volatile memory 1418 may be used to store, for example, local time measurements and/or reference time measurements determined by the time synchronizer 300 of FIG. 3 and/or one or more of the time synchronizers 160-190 of FIG. 1.

As an alternative to implementing the methods and/or apparatus described herein in a system such as the device of FIG. 14, the methods and or apparatus described herein may alternatively be embedded in a structure such as a processor and/or an ASIC (application specific integrated circuit).

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to synchronize local time at a node in a computer network with a reference time source, the method comprising determining a sequence of time sample pairs, wherein each time sample pair in the sequence of time sample pairs comprises a local time measurement based on at least one corresponding local time stamp generated by the node and a respective reference time measurement based on at least one corresponding reference time stamp generated by the reference time source;

determining a plurality of cubic splines, wherein each cubic spline in the plurality of cubic splines interpolates between two respective time sample pairs in the sequence of time sample pairs; and mapping a local time value associated with the node to a corresponding reference time value associated with the reference time source based on the plurality of cubic splines, wherein mapping the local time value to the corresponding reference time value comprises:

selecting one of a sequence of non-overlapping intervals corresponding to the local time value, wherein the selected time interval includes the local time value;

selecting one of the plurality of cubic splines corresponding to the selected interval; and evaluating the selected cubic spline at the local time value to determine the reference time value corresponding to the local time value.

2. A method as defined in claim 1 wherein the local time measurement comprises an average of a first local time stamp and a subsequent second local time stamp generated by the node during a measurement interval.

3. A method as defined in claim 2 wherein the second local time stamp is generated by the node in response to a message received by the node from the reference time source, wherein the reference time source transmits the message after determining the reference time measurement.

4. A method as defined in claim 3 wherein the message includes the reference time measurement and wherein the time sample pair is determined by the node.

5. A method as defined in claim 2 wherein a measurement burst comprises a plurality of measurement intervals and wherein the local time measurement further comprises an average of individual local time measurements determined during the measurement burst.

6. A method as defined in claim 1 wherein the reference time measurement comprises a reference time stamp generated by the reference time source in response to a message received by the reference time source from the node during a measurement interval.

7. A method as defined in claim 6 wherein a measurement burst comprises a plurality of measurement intervals and wherein the reference time measurement further comprises an average of reference time stamps determined during the measurement burst.

8. A method to synchronize local time at a node in a computer network with a reference time source, the method comprising determining a sequence of time sample pairs, wherein each time sample pair in the sequence of time sample pairs comprises a local time measurement based on at least one corresponding local time stamp generated by the node and a respective reference time measurement based on at least one corresponding reference time stamp generated by the reference time source;

determining a plurality of cubic splines, wherein each cubic spline in the plurality of cubic splines interpolates between two respective time sample pairs in the sequence of time sample pairs; and mapping a local time value associated with the node to a corresponding reference time value associated with the reference time source based on the plurality of cubic splines, wherein:

the sequence of time sample pairs corresponds to a time domain beginning with an initial time sample pair and ending with a final time sample pair;

the time domain comprises a sequence of non-overlapping intervals;

an interval in the sequence of non-overlapping intervals is defined by endpoints comprising adjacent time sample pairs;

adjacent intervals share a common endpoint;

the plurality of cubic splines is determined as a sequence of cubic splines;

the plurality of cubic splines interpolates between the initial time sample pair and the final time sample pair over the time domain; and adjacent cubic splines interpolate over adjacent intervals.

9. A method to synchronize local time at a node in a computer network with a reference time source, the method comprising determining a sequence of time sample pairs, wherein each time sample pair in the sequence of time sample pairs comprises a local time measurement based on at least one corresponding local time stamp generated by the node and a respective reference time measurement based on at least one corresponding reference time stamp generated by the reference time source;

determining a plurality of cubic splines, wherein each cubic spline in the plurality of cubic splines interpolates between two respective time sample pairs in the sequence of time sample pairs; and mapping a local time value associated with the node to a corresponding reference time value associated with the reference time source based on the plurality of cubic splines, wherein the plurality of cubic splines comprises a sequence of constrained cubic splines governed by constraints, wherein the constraints comprise at least one of:

requiring adjacent constrained cubic splines corresponding to adjacent intervals to have substantially equal first derivatives at a common endpoint shared by the adjacent intervals; or requiring each constrained cubic spline to output values not exceeding a range bounded by the adjacent time sample pairs comprising endpoints of the interval corresponding to the constrained cubic spline; or requiring an outermost constrained cubic spline in the sequence of cubic splines to have a first derivative at an outermost endpoint of the corresponding interval to be substantially equal to a slope of a line constructed to interpolate between the sequence of time sample points.

10. A method as defined in claim 1 wherein mapping the local time value to the corresponding reference time value comprises evaluating an output of at least one cubic spline in the plurality of cubic splines based on an input substantially equal to the local time value to determine the reference time value corresponding to the local time value.

11. A method as defined in claim 1 wherein the reference time measurement comprises an average of a first reference time stamp and a subsequent second reference time stamp generated by the reference time source during a measurement interval.

12. A method as defined in claim 11 wherein the local time measurement comprises a local time stamp generated by the node in response to a message received by the node from the reference time source during the measurement interval.

13. A method as defined in claim 12 wherein the message is a first message and wherein the second reference time stamp is generated by the reference time source in response to a second message received by the reference time source from the node.

14. A method as defined in claim 11 wherein a measurement burst comprises a plurality of measurement intervals and wherein the reference time measurement further comprises an average of individual reference time measurements determined during the measurement burst.

15. A method as defined in claim 12 wherein a measurement burst comprises a plurality of measurement intervals and wherein the local time measurement further comprises an average of local time stamps determined during the measurement burst.

16. A method as defined in claim 1 wherein the node is a first node, the sequence of time sample pairs is a first sequence of time sample pairs associated with the first node and the plurality of cubic splines is a first plurality of cubic splines associated with the first node, and further comprising synchronizing local time at a second node in the computer network with the reference time source by determining a second sequence of time sample pairs and a second plurality of cubic splines associated with the second node.

17. A method as defined in claim 16 wherein determining the second sequence of time sample pairs is interleaved with determining the first sequence of time sample pairs.

18. An article of manufacture comprising a computer storage medium for storing machine readable instructions which, when executed, cause a machine to:
  determine a sequence of time sample pairs, wherein each time sample pair in the sequence of time sample pairs comprises a local time measurement based on at least one corresponding local time stamp generated by a node in a computer network and a respective reference time measurement based on at least one corresponding reference time stamp generated by a reference time source;
  determine a plurality of cubic splines, wherein each cubic spline in the plurality of cubic splines interpolates between two respective time sample pairs in the sequence of time sample pairs; and
  map a local time value associated with the node to a corresponding reference time value associated with the reference time source based on the plurality of cubic splines, wherein:
  the sequence of time sample pairs corresponds to a time domain beginning with an initial time sample pair and ending with a final time sample pair;
  the time domain comprises a sequence of non-overlapping intervals;
  an interval in the sequence of non-overlapping intervals is defined by endpoints comprising adjacent time sample pairs;
  adjacent intervals share a common endpoint;
  the plurality of cubic splines is determined as a sequence of cubic splines;
  the plurality of cubic splines interpolates between the initial time sample pair and the final time sample pair over the time domain; and adjacent cubic splines interpolate over adjacent intervals.

19. An article of manufacture as defined in claim 18 wherein the machine readable instructions, when executed, further cause the machine to determine the local time measurement by averaging a first local time stamp and a subsequent second local time stamp generated by the node during a measurement interval.

20. An article of manufacture as defined in claim 19 wherein the reference time measurement comprises a reference time stamp generated by the reference time source in response to a message received by the reference time source from the node during the measurement interval.

21. An article of manufacture as defined in claim 18 wherein the machine readable instructions, when executed, further cause the machine to map the local time value to the corresponding reference time value by evaluating an output of at least one cubic spline in the plurality of cubic splines based on an input substantially equal to the local time value to determine the reference time value corresponding to the local time value.

22. An apparatus to synchronize local time at a node in a computer network with a reference time source, the apparatus comprising
  a time sample sequence processor to determine a sequence of time sample pairs, wherein each time sample pair in the sequence of time sample pairs comprises a local time measurement based on at least one corresponding local time stamp generated by the node and a respective reference time measurement based on at least one corresponding reference time stamp generated by the reference time source;
  an interpolator to determine a plurality of cubic splines, wherein each cubic spline in the plurality of cubic splines interpolates between two respective time sample pairs in the sequence of time sample pairs; and
  a time mapper to map a local time value associated with the node to a corresponding reference time value associated with the reference time source based on the plurality of cubic splines, wherein:
  the sequence of time sample pairs corresponds to a time domain beginning with an initial time sample pair and ending with a final time sample pair;
  the time domain comprises a sequence of non-overlapping intervals;
  an interval in the sequence of non-overlapping intervals is defined by endpoints comprising adjacent time sample pairs;
  adjacent intervals share a common endpoint;
  the interpolator is further configured to determine the plurality of cubic splines as a sequence of cubic splines to interpolate between the initial time sample and the final time sample; and adjacent cubic splines interpolate over adjacent intervals.

23. An apparatus as defined in claim 22 further comprising a clock interface to communicatively couple with a clock to obtain at least one of the local time stamp or the reference time stamp, wherein the at least one of the local time stamp or the reference time stamp corresponds to a value of the clock.

24. An apparatus as defined in claim 22 further comprising a time sample burst processor configured to obtain a plurality of local time stamps and a plurality of reference time stamps during a measurement burst comprising a plurality of measurement intervals, and wherein the local time measurement further comprises an average of the plurality of local time stamps and the reference time measurement further comprises an average of the plurality of reference time stamps.

25. An apparatus as defined in claim 22 wherein the time mapper is to map the local time value to the corresponding reference time value by evaluating an output of at least one cubic spline in the plurality of cubic splines based on an input substantially equal to the local time value to determine the reference time value corresponding to the local time value.

26. A system to synchronize local time with reference time in a computer network, the system comprising:
  a reference time source communicatively coupled to the communication network and comprising a reference clock;

a node communicatively coupled to the communication network and comprising a local clock; and a local time synchronizer at least one of implemented by or communicatively coupled to at least one of the reference time source or the node to map a local time value associated with the local clock to a corresponding reference time value associated with the reference clock based on:

a sequence of time sample pairs comprising local time measurements based on the local clock paired with respective ones of reference time measurements based on the reference clock; and a plurality of cubic splines determined to interpolate between the sequence of time sample pairs to map local time values to reference time values, wherein:

the sequence of time sample pairs corresponds to a time domain beginning with an initial time sample pair and ending with a final time sample pair;

the time domain comprises a sequence of non-overlapping intervals;

an interval in the sequence of non-overlapping intervals is defined by endpoints comprising adjacent time sample pairs;

adjacent intervals share a common endpoint;

the plurality of cubic splines is determined as a sequence of cubic splines;

the plurality of cubic splines interpolates between the initial time sample pair and the final time sample pair over the time domain; and adjacent cubic splines interpolate over adjacent intervals.

27. A system as defined in claim 26 wherein the local time synchronizer is further configured to map the local time value to the corresponding reference time value by evaluating an output of at least one cubic spline in the plurality of cubic splines based on an input substantially equal to the local time value to determine the reference time value corresponding to the local time value.

* * * * *

UNITED STATES PATENT AND TRADEMARK OFFICE
CERTIFICATE OF CORRECTION

| | | |
|---|---|---|
| PATENT NO. | : 7,487,229 B2 | Page 1 of 1 |
| APPLICATION NO. | : 11/393100 | |
| DATED | : February 3, 2009 | |
| INVENTOR(S) | : Ohly | |

It is certified that error appears in the above-identified patent and that said Letters Patent is hereby corrected as shown below:

In the Claims

Col. 29, line 57, Claim 18 after "the time" and before "and" delete "domaim;" and insert -- domain; --.

Signed and Sealed this
Twenty-fifth Day of March, 2014

Michelle K. Lee
*Deputy Director of the United States Patent and Trademark Office*